US008504497B2

(12) United States Patent
Amin

(10) Patent No.: US 8,504,497 B2
(45) Date of Patent: Aug. 6, 2013

(54) METHODS OF ADIABATIC QUANTUM COMPUTATION

(75) Inventor: Mohammad H. Amin, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 564 days.

(21) Appl. No.: 12/845,352

(22) Filed: Jul. 28, 2010

(65) Prior Publication Data

US 2010/0306142 A1     Dec. 2, 2010

Related U.S. Application Data

(62) Division of application No. 11/625,702, filed on Jan. 22, 2007, now Pat. No. 7,788,192.

(60) Provisional application No. 60/762,619, filed on Jan. 27, 2006.

(51) Int. Cl.
*G06F 15/18* (2006.01)
*G06N 3/00* (2006.01)
*G06N 3/12* (2006.01)

(52) U.S. Cl.
USPC .......................................................... 706/13

(58) Field of Classification Search
None
See application file for complete search history.

(56) References Cited

U.S. PATENT DOCUMENTS

| | | | |
|---|---|---|---|
| 5,357,589 A | 10/1994 | Brown, Jr. et al. | 385/16 |
| 6,803,599 B2 | 10/2004 | Amin et al. | 257/31 |
| 6,838,694 B2 | 1/2005 | Esteve et al. | 257/34 |
| 6,936,841 B2 | 8/2005 | Amin et al. | 257/31 |
| 7,135,701 B2 | 11/2006 | Amin et al. | 257/31 |
| 7,418,283 B2 | 8/2008 | Amin | 505/170 |
| 2003/0164490 A1 | 9/2003 | Blais | 257/14 |
| 2003/0224944 A1 | 12/2003 | Il'ichev et al. | 505/170 |
| 2005/0082519 A1 | 4/2005 | Amin et al. | 257/13 |
| 2005/0224784 A1 | 10/2005 | Amin et al. | 257/14 |
| 2005/0250651 A1 | 11/2005 | Amin et al. | 505/846 |
| 2005/0256007 A1 | 11/2005 | Amin et al. | 505/170 |
| 2007/0180586 A1 | 8/2007 | Amin | 977/755 |

OTHER PUBLICATIONS

'Quantum computing with spin qubits interacting through delocalized excitons:Overcoming hole mixing': Lovett, Physical review B 72, 115324, 2005.*
'Adiabatic Quantum Computation With Flux Qubits, First Experimental Results': Ploeg, 2007, IEEE, 1051-8223, pp. 113-119.*

(Continued)

*Primary Examiner* — Kakali Chaki
*Assistant Examiner* — Peter Coughlan
(74) *Attorney, Agent, or Firm* — Seed IP Law Group PLLC

(57) ABSTRACT

A method for quantum computing using a quantum system comprising a plurality of qubits is provided. The system can be in any one of at least two configurations at any given time including one characterized by an initialization Hamiltonian $H_O$ and one characterized by a problem Hamiltonian $H_P$. The problem Hamiltonian $H_P$ has a final state. Each respective first qubit in the qubits is arranged with respect to a respective second qubit in the qubits such that they define a predetermined coupling strength. The predetermined coupling strengths between the qubits in the plurality of qubits collectively define a computational problem to be solved. In the method, the system is initialized to $H_O$ and is then adiabatically changed until the system is described by the final state of the problem Hamiltonian $H_P$. Then the state of the system is read out by probing an observable of the $\sigma_X$ Pauli matrix operator.

15 Claims, 16 Drawing Sheets

OTHER PUBLICATIONS

Allen et al., "Blue Gene: A vision for protein science using a petaflop supercomputer," *IBM Systems Journal* 40(2):310-327, 2001.

Amin et al., "Adiabatic Quantum Computation with Superconducting Qubits," U.S. Appl. No. 60/557,748, filed Mar. 29, 2004, 60 pages.

Amin, "Methods of Adiabatic Quantum Computation," U.S. Appl. No. 60/762,619, filed Jan. 27, 2006, 107 pages.

Amin, "Methods of Adiabatic Quantum Computation," Office Action mailed Oct. 21, 2009 for U.S. Appl. No. 11/625,702, 19 pages.

Amin, "Methods of Adiabatic Quantum Computation," Amendment filed Jan. 15, 2010 for U.S. Appl. No. 11/625,702, 13 pages.

Amin, "Methods of Adiabatic Quantum Computation," Notice of Allowance and Examiner's Amendment mailed Apr. 28, 2010 for U.S. Appl. No. 11/625,702, 18 pages.

Averin, "Adiabatic Quantum Computation with Cooper Pairs," *Solid State Communications* 105(10):659-664, 1998.

Brody et al., "Random-matrix physics: spectrum and strength fluctuations," *Reviews of Modern Physics* 53(3):385-479, Jul. 1981.

Butcher, "Advances in persistent-current qubit research: Inductively coupled qubits and novel biasing methods," Thesis in Faculty of Applied Sciences, Delft University of Technology, Delft, The Netherlands, Jan. 10, 2002.

Choi, "Geometric Quantum Computation on Solid-State Qubits," *Journal of Physics: Condensed Matter* 15:7823-7833, 2003.

Dolan et al., "Optimization on the NEOS Server," *SIAM News* 35(6):1-5, Jul./Aug. 2002.

Esteve et al., "Solid State Quantum Bit Circuits," *Quantronics, SPEC, CEA-Saclay*, Gif sur Yvette, France, 39 pages, 2005.

Farhi et al., "Quantum Adiabatic Evolution Algorithms versus Simulated Annealing," arXiv:quant-ph/0201031 v1, pp. 1-16, Jan. 8, 2002.

Feynman, "Simulating Physics with Computers," *International Journal of Theoretical Physics* 21(6/7):467-488, 1982.

Fourer et al., "Optimization as an Internet Resource," *Interfaces* 31(2):130-150, Mar.-Apr. 2001.

Garanin et al., "Effects of nonlinear sweep in the Landau-Zener-Stueckelberg effect," *Physical Review B* 66:174438-1-174438-11, 2002.

Goemans et al., ".878-Approximation Algorithms for MAX CUT and MAX 2SAT," In *Proceedings of the Twenty-Sixth Annual ACM Symposium on the Theory of Computing*, pp. 422-431, Montreal, Quebec, Canada, May 23-25, 1994.

Grajcar et al., "Adiabatic Quantum Computation with Superconducting Qubits," U.S. Appl. No. 60/588,002, filed Jul. 13, 2004, 90 pages.

Grajcar et al., "Experimental realization of direct Josephson coupling between superconducting flux qubits," arXiv:cond-mat/0501085 v1, pp. 1-4, Jan. 5, 2005.

Grajcar et al., "Possible Implementation of Adiabatic Quantum Algorithm with Superconducting Flux Qubits," *Physical Review B* 71(144501):1-8, 2005.

Il'ichev et al., "Continuous Monitoring of Rabi Oscillations in a Josephson Flux Qubit," *Physical Review Letters* 91(9):0797906-1-097906-4, Aug. 29, 2003.

Il'ichev et al., "Radio-Frequency Method for Investigation of Quantum Properties of Superconducting Structures," arXiv:cond-mat/0402559 v3, pp. 1-10, Jun. 23, 2004.

Kamon et al., "Fasthenry: A Multipole-Accelerated 3-D Inductance Extraction Program," *IEEE Transactions on Microwave Theory and Techniques* 42(9):1750-1758, Sep. 1994.

Madou, *Fundamentals of Microfabrication: The Science of Miniaturization*, Second Edition, CRC Press, 2002, pp. 1-14.

Majer, "Superconducting Quantum Circuits," Thesis in Faculty of Applied Sciences, Delft University of Technology, Delft, The Netherlands, 2002.

Makhlin, "Quantum-state engineering with Josephson-junction devices," *Reviews of Modern Physics* 73:357-400, Apr. 2001.

Mooij et al., "Josephson Persistent-Current Qubit," *Science* 285:1036-1039, Aug. 13, 1999.

Nielsen et al., *Quantum Computation and Quantum Information*, Cambridge University Press, Cambridge (2000), pp. 343-345.

Ramos et al., "Design for Effective Thermalization of Junctions for Quantum Coherence," *IEEE Transactions on Applied Superconductivity* 11(1):998-1001, Mar. 2001.

Roland et al., "Quantum Search by Local Adiabatic Evolution," *Physical Review A* 65(042308):1-6, 2002.

Shirts et al., "Computing: Screen Savers of the World Unite!" *Science* 290(5498):1903-1904, Dec. 2000.

Shor, "Introduction to Quantum Algorithms," arXiv:quant-ph/0005003 v2, pp. 1-17, Jul. 6, 2001.

Siu, "From Quantum Circuits to Adiabatic Algorithms," *Physical Review A* 71(062314:1-9, 2005.

van der Wal et al., "Quantum Superpositions of Persistent Josephson Currents," Thesis in Faculty of Applied Sciences, Delft University of Technology, Delft, The Netherlands, 2001.

Van der Weil et al., "Semiconductor Quantum Dots for Electron Spin Qubits," *New Journal of Physics* 8(28):1-26, 2006.

"A High-Level Look at Optimization: Past, Present, and Future," e-Optimization.com, 2000.

International Search Report, mailed Apr. 11, 2007, for PCT/CA2007/000082, 2 pages.

Written Opinion, mailed Apr. 11, 2007, for PCT/CA2007/000082, 6 pages.

* cited by examiner $$H(t) = (1-\gamma(t))H_0(t) + \gamma(t)H_P(t) + \delta(t)H_E(t)$$

$$\gamma(t) \in \mathbb{C}[0,T] \, ; \, \gamma(0) = 0 \, ; \, \gamma(T) = 1$$

$$\delta(t) \in \mathbb{C}[0,T] \, ; \, \delta(0) = 0 \, ; \, \delta(T) = 0$$

FIG. 3
PRIOR ART

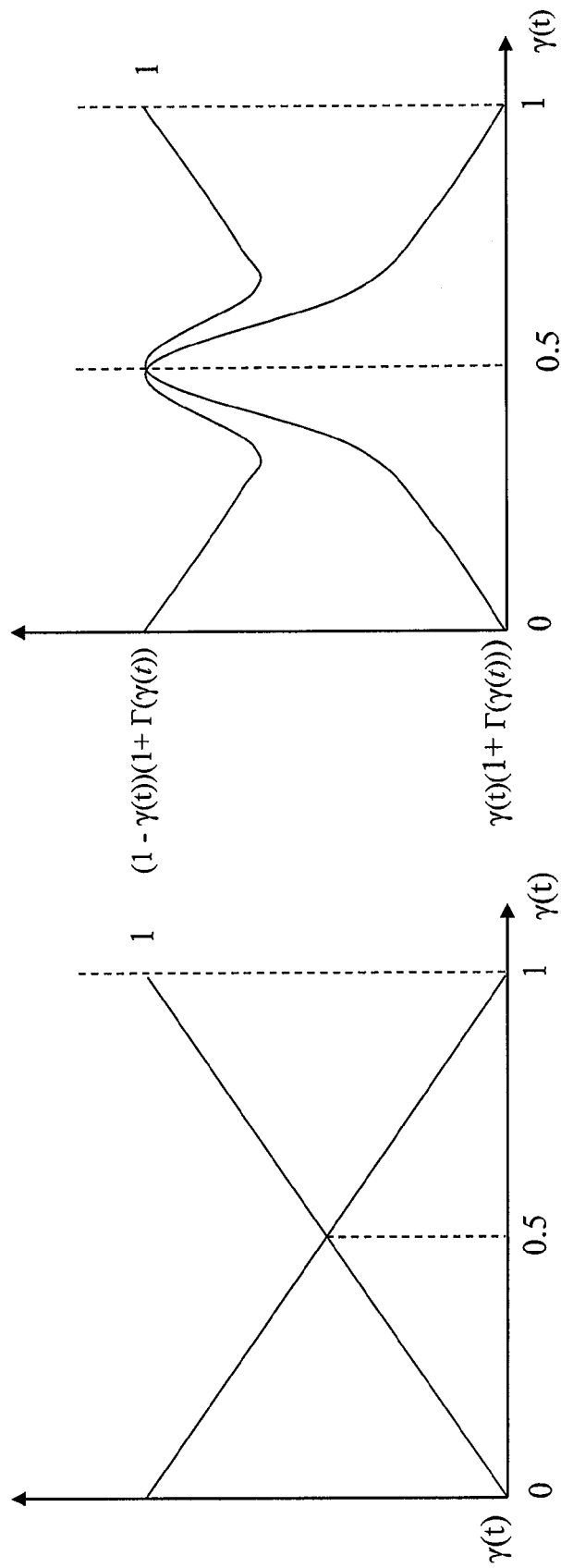

METHODS OF ADIABATIC QUANTUM COMPUTATION

CROSS-REFERENCE TO RELATED APPLICATION

This application is a division of U.S. patent application Ser. No. 11/625,702, filed Jan. 22, 2007, now pending, which claims benefit under 37 CFR 119(e) to provisional patent application No. 60/762,619, filed Jan. 27, 2006, which applications are incorporated herein by reference in their entirety.

BACKGROUND

1. Field

Apparatus and methods for performing quantum computing are provided. The systems and methods involve the use of superconducting circuitry and, more specifically, the use of devices for quantum computation.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

An example of the circuit model is shown in FIG. 2. Circuit 200 is an implementation of the quantum Fourier transform. The quantum Fourier transform is a useful procedure found in many quantum computing applications based on the circuit model. See, for example, United States Patent Publication 2003/0164490 A1, entitled "Optimization process for quantum computing process," which is hereby incorporated by reference in its entirety. Time progresses from left to right, i.e., time step 201 precedes time step 202, and so forth. The four qubits in the quantum system described by FIG. 2 are indexed 0-3 from bottom to top. The state of qubit 0 at any given time step is represented by wire S0-S0", the state of qubit 1 at any give time step is represented by S1-S1', etc. In time step 201, a single-qubit unitary gate, $A_3$, is applied to qubit 3. The next gate on wire S3-S3' for qubit 3 is a two-qubit gate, $B_{23}$, which is applied to qubits 2 and 3 at time step 202. In general the $A_i$ gate (e.g., $A_3$ as applied to qubit 3 at time step 201) is a HADAMARD gate applied on the $i^{th}$ qubit while the $B_{ij}$ gate (e.g., $B_{23}$ which is applied to qubits 2 and 3 at time step 202) is a CPHASE gate coupling the $i^{th}$ and $j^{th}$ qubit. The application of unitary gates continues until states S0-S3 have been converted to S0'-S3'. After time step 210, more unitary gates can be applied to the qubits or the states of the qubits can be determined (e.g., by measurement).

Another approach to quantum computation, involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al., "Quantum Adiabatic Evolution Algorithms versus Stimulated Annealing" arXiv.org:quant-ph/0201031 (2002), pp 1-24.

As shown in FIG. 3, adiabatic quantum computing involves initializing a system, which encodes a problem to be solved, to an initial state. This initial state is described by an initial Hamiltonian $H_0$. Then the system is migrated adiabatically to a final state described by Hamiltonian $H_P$. The final state encodes a solution to the problem. The migration from $H_0$ to $H_P$ follows an interpolation path described by function $\gamma(t)$ that is continuous over the time interval zero to T, inclusive, and has a condition that the magnitude of initial Hamiltonian $H_0$ is reduced to zero after time T. Here, T, refers to the time point at which the system reaches the state represented by the Hamiltonian $H_P$. Optionally, the interpolation can traverse an extra Hamiltonian $H_E$ that can contain tunneling terms for some or all of the qubits represented by $H_0$. The magnitude of extra Hamiltonian $H_E$ is described by a function $\delta(t)$ that is continuous over the time interval zero to T, inclusive, and is zero at the start (t=0) and end (t=T) of the interpolation while being non-zero at all or a portion of the times between t=0 and t=T.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar to those used for conventional integrated circuits.

Superconducting qubits are a type of superconducting device that can be included in a superconducting integrated circuit. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. No. 6,838,694 and U.S. Patent Application No. 2005-0082519.

FIG. 1A illustrates a persistent current qubit 101. Persistent current qubit 101 comprises a loop 103 of superconducting material interrupted by Josephson junctions 101-1, 101-2, and 101-3. Josephson junctions are typically formed using standard fabrication processes, generally involving material deposition and lithography stages. See, e.g., Madou, *Fundamentals of Microfabrication*, Second Edition, CRC Press, 2002. Methods for fabricating Josephson junctions are well known and described in Ramos et al., 2001, *IEEE Trans. App. Supercond.* 11, 998, for example. Details specific to persistent current qubits can be found in C. H. van der Wal, 2001; J. B. Majer, 2002; and J. R. Butcher, 2002, all Theses in Faculty of Applied Sciences, Delft University of Technology, Delft, The Netherlands; http://qt.tn.tudelft.nl; Kavli Institute of Nanoscience Delft, Delft University of Technology, P.O. Box 5046, 2600 GA Delft, The Netherlands. Common substrates include silicon, silicon oxide, or sapphire, for example. Josephson junctions can also include insulating materials such as aluminum oxide, for example. Exemplary superconducting materials useful for forming superconducting loop 103 are aluminum and niobium. The Josephson junctions have cross-sectional sizes ranging from about 10 nanometers (nm) to about 10 micrometers (μm). One or more of the Josephson junctions 101 has parameters, such as the size of the junction, the junction surface area, the Josephson energy or the charging energy that differ from the other Josephson junctions in the qubit.

The difference between any two Josephson junctions in the persistent current qubit is characterized by a coefficient, termed α, which typically ranges from about 0.5 to about 1.3. In some instances, the term α for a pair of Josephson junctions in the persistent current qubit is the ratio of the critical current between the two Josephson junctions in the pair. The critical current of a Josephson junction is the minimum current through the junction at which the junction is no longer superconducting. That is, below the critical current, the junction is superconducting whereas above the critical current, the junction is not superconducting. Thus, for example, the term α for junctions 101-1 and 101-2 is defined as the ratio between the critical current of junction 101-1 and the critical current of junction 101-2.

Referring to FIG. 1A, a bias source 110 is inductively coupled to persistent current qubit 101. Bias source 110 is used to thread a magnetic flux $\Phi_x$ through phase qubit 101 to provide control of the state of the phase qubit. In some instances, the persistent current qubit operates with a magnetic flux bias $\Phi_x$ ranging from about $0.2 \cdot \Phi_0$ to about $0.8 \cdot \Phi_0$, where $\Phi_0$ is the flux quantum. In some instances, the magnetic flux bias ranges from about $0.47 \cdot \Phi_0$ to about $0.5 \cdot \Phi_0$.

Persistent current qubit 101 has a two-dimensional potential with respect to the phase across Josephson junctions 101-1, 101-2, and 101-3. In some instances, persistent current qubit 101 is biased with a magnetic flux $\Phi_x$, such that the two-dimensional potential profile includes regions of local energy minima, where the local energy minima are separated from each other by small energy barriers and are separated from other regions by large energy barriers. In some instances, this potential has the shape of double well potential 100B (FIG. 1B), which includes a left well 160-0 and a right well 160-1. In such instances, left well 160-0 can represent clockwise (102-0) circulating supercurrent in the phase qubit 101 and right well 160-1 can represent counter-clockwise (102-1) circulating supercurrent in persistent current qubit 101 of FIG. 1A.

When wells 160-0 and 160-1 are at or near degeneracy, meaning that they are at the same or nearly the same energy potential as illustrated in FIG. 1B, the quantum state of persistent current qubit 101 becomes a coherent superposition of the phase or basis states and device can be operated as a phase qubit. The point at or near degeneracy is herein referred to as the point of computational operation of the persistent current. During computational operation of the persistent current qubit, the charge of the qubit is fixed leading to uncertainty in the phase basis and delocalization of the phase states of the qubit. Controllable quantum effects can then be used to process the information stored in those phase states according to the rules of quantum mechanics. This makes the persistent current qubit robust against charge noise and thereby prolongs the time under which the qubit can be maintained in a coherent superposition of basis states.

Computational Complexity Theory

In computer science, computational complexity theory is the branch of the theory of computation that studies the resources, or cost, of the computation required to solve a given computational problem. This cost is usually measured in terms of abstract parameters such as time and space, called computational resources. Time represents the number of steps required to solve a problem and space represents the quantity of information storage required or how much memory is required.

Computational complexity theory classifies computational problems into complexity classes. The number of complexity classes is ever changing, as new ones are defined and existing ones merge through the contributions of computer scientists. The complexity classes of decision problems include:

1. P—The complexity class containing decision problems that can be solved by a deterministic UTM using a polynomial amount of computation time;
2. NP ("Non-deterministic Polynomial time")—The set of decision problems solvable in polynomial time on a non-deterministic UTM. Equivalently, it is the set of problems that can be "verified" by a deterministic UTM in polynomial time;
3. NP-hard (Non-deterministic UTM Polynomial-time hard)—The class of decision problems that contains all problems H, such that for every decision problem L in NP there exists a polynomial-time many-one reduction to H. Informally, this class can be described as containing the decision problems that are at least as hard as any problem in NP;
4. NP-complete—A decision problem C is NP-complete if it is complete for NP, meaning that:
   (a) it is in NP and
   (b) it is NP-hard,
   i.e., every other problem in NP is reducible to it. "Reducible" means that for every problem L, there is a polynomial-time many-one reduction, a deterministic algorithm which transforms instances $l \in L$ into instances $c \in C$, such that the answer to c is YES if and only if the answer to I is YES. To prove that an NP problem A is in fact an NP-complete problem it is sufficient to show that an already known NP-complete problem reduces to A.

Decision problems have binary outcomes. Problems in NP are computation problems for which there exists a polynomial time verification. That is, it takes no more than polynomial time (class P) in the size of the problem to verify a potential solution. It may take more than polynomial time, however, to find a potential solution. NP-hard problems are at least as hard as any problem in NP.

Optimization problems are problems for which one or more objective functions are minimized or maximized over a set of variables, sometimes subject to a set of constraints. For example, the Traveling Salesman Problem ("TSP") is an optimization problem where an objective function representing, for example, distance or cost, must be optimized to find an itinerary, which is encoded in a set of variables representing the optimized solution to the problem. For example, given a list of locations, the problem may consist of finding the shortest route that visits all locations exactly once. Other examples of optimization problems include Maximum Independent Set, integer programming, constraint optimization, factoring, prediction modeling, and k-SAT. These problems are abstractions of many real-world optimization problems, such as operations research, financial portfolio selection, scheduling, supply management, circuit design, and travel route optimization. Many large-scale decision-based optimization problems are NP-hard. See e.g., "*A High-Level Look at Optimization: Past, Present, and Future*" e-Optimization.com, 2000.

Simulation problems typically deal with the simulation of one system by another system, usually over a period of time. For example, computer simulations can be made of business processes, ecological habitats, protein folding, molecular ground states, quantum systems, and the like. Such problems often include many different entities with complex inter-relationships and behavioral rules. In Feynman it was suggested that a quantum system could be used to simulate some physical systems more efficiently than a UTM.

Many optimization and simulation problems are not solvable using UTMs. Because of this limitation, there is need in the art for computational devices capable of solving computational problems beyond the scope of UTMs. In the field of protein folding, for example, grid computing systems and supercomputers have been used to try to simulate large protein systems. See Shirts et al., 2000, *Science* 290, pp. 1903-1904, and Allen et al., 2001, *IBM Systems Journal* 40, p. 310. The NEOS solver is an online network solver for optimization problems, where a user submits an optimization problem, selects an algorithm to solve it, and then a central server directs the problem to a computer in the network capable of running the selected algorithm. See e.g., Dolan et al., 2002, *SIAM News* Vol. 35, p. 6. Other digital computer-based systems and methods for solving optimization problems can be found, for example, in Fourer et al., 2001, *Interfaces* 31, pp. 130-150. All these methods are limited, however, by the fact they utilize digital computers, which are UTMs, and accordingly, are subject to the limits of classical computing that impose unfavorable scaling between problem size and solution time.

SUMMARY

The need in the art for improved systems and methods for adiabatic quantum computing are addressed by the present apparatus and methods. In some embodiments, a graph based computing problem, such as MAXCUT, is represented by an undirected edge-weighted graph. Each node in the edge-weighted graph corresponds to a qubit in a plurality of qubits.

The edge weights of the graph are represented in the plurality of qubits by the values of the coupling energies between the qubits. For example, the edge weight between a first and second node in the graph is represented by the coupling energy between a corresponding first and second qubit in the plurality of qubits.

In one aspect of the present methods, the plurality of qubits that represents the graph is initialized to a first state that does not permit the qubits to quantum tunnel. Then, the plurality of qubits is set to an intermediate state in which quantum tunneling between individual basis states within each qubit in the plurality of qubits can occur. In some embodiments, the change to the intermediate state occurs adiabatically. In other words, for any given instant t that occurs during the change to the intermediate state or while the qubits are in the intermediate state, the plurality of qubits are in the ground state of an instantaneous Hamiltonian that describes the plurality of qubits at the instant t. The qubits remain in the intermediate state that permits quantum tunneling between basis states for a period of time that is sufficiently long enough to allow the plurality of qubits to reach a solution for the computation problem represented by the plurality of qubits.

Once the qubits have been permitted to quantum tunnel for a sufficient period of time, the state of the qubits is adjusted such that they reach some final state that either does not permit quantum tunneling or, at least, does not permit rapid quantum tunneling. In some embodiments, the change to the final state occurs adiabatically. In other words, for any given instant t that occurs during the change to the final state, the plurality of qubits are in the ground state of an instantaneous Hamiltonian that describes the plurality of qubits at the instant t.

In other examples of the systems and methods of the present methods, the plurality of qubits that represents the graph is initialized to a first state that does permit the qubits to quantum tunnel. The state of the quantum system is changed once the qubits have been permitted to quantum tunnel for a sufficient period of time. The state of the qubits is adjusted such that they reach some final state that either does not permit quantum tunneling or, at least, does not permit rapid quantum tunneling. In some embodiments, the change to the final state occurs adiabatically.

Some embodiments of the present methods are universal quantum computers in the adiabatic quantum computing model. Some embodiments of the present methods include qubits with single-qubit Hamiltonian terms and at least one two-qubit Hamiltonian term.

A first aspect of the present methods is a method for quantum computing using a quantum system comprising a plurality of superconducting qubits. The quantum system is characterized by an impedance. Also, the quantum system is capable of being in any one of at least two configurations at any given time. These at least two configurations include a first configuration characterized by an initialization Hamiltonian $H_O$ as well as a second configuration characterized by a problem Hamiltonian $H_P$. The problem Hamiltonian has a ground state. Each respective first superconducting qubit in the plurality of superconducting qubits is arranged with respect to a respective second superconducting qubit in the plurality of superconducting qubits such that the first respective superconducting qubit and the corresponding second respective superconducting qubit define a predetermined coupling strength. The predetermined coupling strengths between each of the first respective superconducting qubit and corresponding second respective superconducting qubit collectively define a computational problem to be solved. In this first aspect of the present methods, the method comprises initializing the quantum system to the initialization Hamiltonian $H_O$. The quantum system is then adiabatically changed until it is described by the ground state of the problem Hamiltonian $H_P$. The state of the quantum system is then read out by probing an observable of the $\sigma_x$ Pauli matrix operator.

In some embodiments in accordance with the above methods, the reading comprises measuring an impedance of the quantum system. In some embodiments the reading comprises determining a state of a superconducting qubit in the plurality of superconducting qubits. In some embodiments, the reading differentiates a ground state of the superconducting qubit from an excited state of the superconducting qubit. In some embodiments, a superconducting qubit in the plurality of superconducting qubits is a persistent current qubit. In some embodiments, the reading measures a quantum state of the superconducting qubit as a presence or an absence of a voltage. In some embodiments, a superconducting qubit in the plurality of superconducting qubits is capable of tunneling between a first stable state and a second stable state when the quantum system is in the first configuration.

In some embodiments, a superconducting qubit in the plurality of superconducting qubits is capable of tunneling between a first stable state and a second stable state during the adiabatic changing. In some embodiments, the adiabatic changing occurs during a time period that is between 1 nanosecond and 100 microseconds. In some embodiments, the initializing includes applying a magnetic field to the plurality of superconducting qubits in the direction of a vector that is perpendicular to a plane defined by the plurality of superconducting qubits. In some embodiments, a superconducting qubit in the plurality of superconducting qubits is a persistent current qubit.

A second aspect of the present methods provides a method for quantum computing using a quantum system that comprises a plurality of superconducting qubits. The quantum system is coupled to an impedance readout device. The quantum system is capable of being in any one of at least two configurations at any given time. The at least two configurations include a first configuration characterized by an initialization Hamiltonian $H_0$, and a second Hamiltonian characterized by a problem Hamiltonian $H_P$. The problem Hamiltonian $H_P$ has a ground state. Each respective first superconducting qubit in the plurality of superconducting qubits is arranged with respect to a respective second superconducting qubit in the plurality of superconducting qubits such that the first respective superconducting qubit and the second respective superconducting qubit define a predetermined coupling strength. The predetermined coupling strength between each first respective superconducting qubit and corresponding second respective superconducting qubit collectively define a computational problem to be solved. These methods may comprise initializing the quantum system to the initialization Hamiltonian $H_O$. Then the quantum system is adiabatically changed until it is described by the ground state of the problem Hamiltonian $H_P$. The state of the quantum system is then read out through the impedance readout device thereby solving the computational problem.

In some embodiments in accordance with these methods, the reading measures a quantum state of a superconducting qubit in the plurality of superconducting qubits as a presence or an absence of a voltage. In some embodiments, the reading differentiates a ground state of the superconducting qubit from an excited state of the superconducting qubit. In some embodiments, a superconducting qubit in the plurality of superconducting qubits is (i) a phase qubit in the charge regime or (ii) a persistent current qubit. In some embodiments, a superconducting qubit in the plurality of superconducting qubits is capable of tunneling between a first stable state and a second stable state when the quantum system is in the first configuration. In some embodiments, a superconducting qubit in the plurality of superconducting qubits is capable of tunneling between a first stable state and a second stable state during the adiabatic changing. In some embodiments, the adiabatic changing occurs during a time period that is greater than 1 nanosecond and less than 100 microseconds. In some embodiments, the initializing includes applying a magnetic field to the plurality of superconducting qubits in the direction of a vector that is perpendicular to a plane defined by the plurality of superconducting qubits. In some embodiments, a superconducting qubit in the plurality of superconducting qubits is a persistent current qubit.

A third aspect of the present methods provides a method of determining a quantum state of a first target superconducting qubit. The method comprises presenting a plurality of superconducting qubits including a first target superconducting qubit in the plurality of superconducting qubits. A problem Hamiltonian describes (i) the quantum state of the plurality of superconducting qubits and (ii) each coupling energy between qubits in the plurality of qubits. The problem Hamiltonian is at or near a ground state. An rf-flux is added to the first target superconducting qubit. The rf-flux has an amplitude that is less than one flux quantum. An amount of an additional flux in the first target superconducting qubit is adiabatically varied. A presence or an absence of a dip in a voltage response of a tank circuit that is inductively coupled with the first target superconducting qubit during the adiabatically varying is observed thereby determining the quantum state of the first target superconducting qubit.

In some embodiments in accordance with these methods, each superconducting qubit in the plurality of superconducting qubits is in a quantum ground state during all or a portion of the adding, the adiabatically varying, and the observing. In some embodiments, the problem Hamiltonian corresponds to a terminus of an adiabatic evolution of the plurality of superconducting qubits. In some embodiments, the method further comprises biasing all or a portion of the superconducting qubits in the plurality of superconducting qubits. The problem Hamiltonian further describes a biasing on the first target superconducting qubit. In some embodiments, an energy of the biasing exceeds the tunneling energy of a tunneling element of the Hamiltonian of the first target superconducting qubit, thereby causing tunneling to be suppressed in the first target superconducting qubit during an instance of the biasing, adding and the adiabatically varying.

In some embodiments in accordance with this third aspect of the present methods, the method further comprises adiabatically removing additional flux that was added to the first target superconducting qubit during the adiabatically varying. In some embodiments, the adiabatically varying comprises adiabatically varying the additional flux in accordance with a waveform selected from the group consisting of periodic, sinusoidal, triangular, and trapezoidal. In some embodiments, the adiabatically varying comprises adiabatically varying the additional flux in accordance with a low harmonic Fourier approximation of a waveform selected from the group consisting of periodic, sinusoidal, triangular, and trapezoidal. In some embodiments, the additional flux has a direction that is deemed positive or negative. In some embodiments, the adiabatically varying is characterized by a waveform that has an amplitude that grows with time. The amplitude of the waveform corresponds to an amount of additional flux that is added to the first target superconducting qubit during the adiabatically varying. In some embodiments, the additional flux has an equilibrium point that varies with time. In some embodiments, the additional flux is either unidirectional or bidirectional. In some embodiments, the additional flux has a frequency of oscillation between about 1 cycle per second and about 100 kilocycles per second.

In some embodiments in accordance with the third aspect of the present methods, the adding comprises adding the rf-flux using (i) an excitation device that is inductively coupled to the first target superconducting qubit or (ii) a the tank circuit. In some embodiments, the method further comprises repeating the adding and the adiabatically varying between 1 time and 100 times. In such embodiments, the presence or absence of the dip in the voltage response of the tank circuit is observed as an average of the voltage response of the tank circuit across each instance of the adiabatically varying.

In some embodiments in accordance with the third aspect of the present methods, the first target superconducting qubit is flipped from an original basis state to an alternate basis state during the adiabatically varying. The method further comprises returning the first target superconducting qubit to its original basis state by adiabatically removing additional flux in the qubit after the adiabatically varying. In some embodiments, the adiabatically varying does not alter the quantum state of each of superconducting qubits in the plurality of superconducting qubits other than the first target superconducting qubit. In some embodiments, the method further comprises recording a presence or an absence of the dip in the voltage response of the tank circuit.

In some embodiments in accordance with the third aspect of the present methods, the method further comprises adding a second rf-flux to a second target superconducting qubit in the plurality of superconducting qubits. The second rf-flux has an amplitude that is less than one flux quantum. Then an amount of a second additional flux in the second target superconducting qubit is adiabatically varied. A presence or an absence of a second dip in a voltage response of a tank circuit that is inductively coupled with the second target superconducting qubit during the adiabatically varying is observed, thereby determining the quantum state of the second target superconducting qubit.

In some embodiments in accordance with the third aspect of the present methods, the method further comprises designating a different superconducting qubit in the plurality of superconducting qubits as the first target superconducting qubit. The adding and the adiabatically varying are then reperformed with the different superconducting qubit as the first target superconducting qubit. The designating and reperforming are repeated until all or a portion (e.g., most, almost all, at least eighty percent) of the superconducting qubits in the plurality of superconducting qubits have been designated as the first target superconducting qubit.

In some embodiments in accordance with the third aspect of the present methods, a tank circuit is inductively coupled with the first target superconducting qubit. The method further comprises performing an adiabatic quantum computation for an amount of time with the plurality of superconducting qubits prior to the adding. The amount of time is determined by a factor the magnitude of which is a function of a number of qubits in the plurality of superconducting qubits. An amount of an additional flux in the first target superconducting qubit is adiabatically varied. Then, a presence or an absence of a dip in the voltage response of a tank circuit during the adiabatically varying is observed, thereby determining the quantum state of the first target superconducting qubit. In some embodiments, the presence of a dip in the voltage response of the tank circuit corresponds to the first target superconducting qubit being in a first basis state. The absence of a dip in the voltage response of the tank circuit corresponds to the target superconducting qubit being in a second basis state.

In some embodiments in accordance with the third aspect of the present methods, the adiabatically varying further comprises identifying an equilibrium point for the additional flux using an approximate evaluation method. In some embodiments, the method further comprises classifying the state of the first target qubit as being in the first basis state when the dip in the voltage across the tank circuit occurs to the left of the equilibrium point and classifying the state of the first target qubit as being in the second basis state when the dip in the voltage across the tank circuit occurs to the right of the equilibrium point.

A fourth aspect of the present methods comprises a method for adiabatic quantum computing using a quantum system comprising a plurality of superconducting qubits. The quantum system is capable of being in any one of at least two quantum configurations at any give time. The at least two quantum configurations include a first configuration described by an initialization Hamiltonian $H_O$ and a second configuration described by a problem Hamiltonian $H_P$. The Hamiltonian $H_P$ has a ground state. The method comprises initializing the quantum system to the first configuration. Then the quantum system is adiabatically changed until it is described by the ground state of the problem Hamiltonian $H_P$. Then the state of the quantum system is read out.

In some embodiments in accordance with the fourth aspect of the present methods, each respective first superconducting qubit in the plurality of superconducting qubits is arranged with respect to a respective second superconducting qubit in the plurality of superconducting qubits such that the first respective superconducting qubit and the corresponding second respective superconducting qubit define a predetermined coupling strength. The predetermined coupling strength between each of the first respective superconducting qubits and corresponding second respective superconducting qubits in the plurality of superconducting qubits collectively define a computational problem to be solved. In some instances, the problem Hamiltonian $H_P$ comprises a tunneling term for each of the respective superconducting qubits in the plurality of superconducting qubits. The energy of the tunneling term for each respective superconducting qubit in the plurality of superconducting qubits is less than the average of the predetermined coupling strengths between each of the first respective superconducting qubits and second respective superconducting qubits in the plurality of superconducting qubits.

In some embodiments in accordance with the fourth aspect of the present methods, the reading out comprises probing an observable of the $\sigma_X$ Pauli matrix operator or $\sigma_Z$ Pauli matrix operator. In some embodiments, a tank circuit is in inductive communication with all or a portion of the superconducting qubits in the plurality of superconducting qubits. In such embodiments, the reading out comprises measuring a voltage across the tank circuit. In some embodiments, the superconducting qubit in the plurality of superconducting qubits is a persistent current qubit.

A fifth aspect of the present methods provides a structure for adiabatic quantum computing comprising a plurality of superconducting qubits. The plurality of superconducting qubits is capable of being in any one of at least two configurations at any give time. The at least two configurations include a first configuration characterized by an initialization Hamiltonian $H_O$ and a second Hamiltonian characterized by a problem Hamiltonian $H_P$. The problem Hamiltonian has a ground state. Each respective first superconducting qubit in the plurality of superconducting qubits is coupled with a respective second superconducting qubit in the plurality of superconducting qubits such that the first respective superconducting qubit and the corresponding second respective superconducting qubit define a predetermined coupling strength. The predetermined coupling strength between each of the first respective superconducting qubits and the corresponding second respective superconducting qubits collectively define a computational problem to be solved. A tank circuit is inductively coupled to all or a portion of the plurality of superconducting qubits.

In some embodiments in accordance with the fifth aspect of the present methods, a superconducting qubit in the plurality of superconducting qubits is a persistent current qubit. In some embodiments, the tank circuit has a quality factor that is greater than 1000. In some embodiments, the tank circuit comprises an inductive element. The inductive element comprises a pancake coil of superconducting material. In some embodiments, the pancake coil of a superconducting material comprising a first turn and a second turn. The superconducting material of the pancake coil is niobium. Furthermore, there is a spacing of 1 about micrometer between the first turn and the second turn of the pancake coil.

In some embodiments in accordance with the fifth aspect of the present methods, the tank circuit comprises an inductive element and a capacitive element that are arranged in parallel or in series with respect to each other. In some embodiments, the tank circuit comprises an inductive element and a capacitive element that are arranged in parallel with respect to each other and the tank circuit has an inductance between about 50 nanohenries and about 250 nanohenries. In some embodiments, the tank circuit comprises an inductive element and a capacitive element that are arranged in parallel with respect to each other and the tank circuit has a capacitance between about 50 picofarads and about 2000 picofarads. In some embodiments, the tank circuit comprises an inductive element and a capacitive element that are arranged in parallel with respect to each other and the tank circuit has a resonance frequency between about 10 megahertz and about 20 megahertz. In some embodiments, the tank circuit has a resonance frequency $f_T$ that is determined by the equality:

$$f_T = \omega_T/2\pi = 1/\sqrt{L_T C_T}$$

such that $L_T$ is an inductance of the tank circuit; and $C_T$ is a capacitance of the tank circuit.

In some embodiments in accordance with the fifth aspect of the present methods, the tank circuit comprises one or more Josephson junctions. In some embodiments, the structure further comprises means for biasing the one or more Josephson junctions of the tank circuit. In some embodiments, the structure further comprises an amplifier connected across the tank circuit in such a manner that the amplifier can detect a change in voltage across the tank circuit. In some embodiments, the amplifier comprises a high electron mobility field-effect transistor (HEMT) or a pseudomorphic high electron mobility field-effect transistor (PHEMT). In some embodiments, the amplifier comprises a multi-stage amplifier. In some embodiments, the multi-stage amplifier comprises two, three, or four transistors. In some embodiments, structure further comprises a helium-3 pot of a dilution refrigerator that is thermally coupled to all or a portion of the plurality of superconducting qubits. to.

In some embodiments in accordance with the fifth aspect of the present methods, the structure further comprising means for driving the tank circuit by a direct bias current $I_{DC}$. In some embodiments, the structure further comprises means for driving the tank circuit by an alternating current $I_{RF}$ of a frequency ω close to the resonance frequency $ω_0$ of the tank circuit. In some embodiments, the total externally applied magnetic flux to a superconducting qubit in the plurality of superconducting qubits, $Φ_E$, is $$Φ_E = Φ_{DC} + Φ_{RF}$$

where, $Φ_{RF}$ is an amount of applied magnetic flux contributed to the superconducting qubit by the alternating current $I_{RF}$; and $Φ_{DC}$ is an amount of applied magnetic flux that is determined by the direct bias current $I_{DC}$. In some embodiments, the structure further comprises means for applying a magnetic field on the superconducting qubit, and wherein $$Φ_{DC} = Φ_A + f(t)Φ_0,$$

where, $Φ_0$ is one flux quantum;

$f(t)Φ_0$ is constant or is slowly varying and is generated by the direct bias current $I_{DC}$; and $$Φ_A = B_A \times L_Q,$$

such that $B_A$ is a magnitude of the magnetic field applied on the superconducting qubit by the means for applying the magnetic field; and $L_Q$ is an inductance of the superconducting qubit.

In some embodiments f(t) has a value between 0 and. In some embodiments, the means for applying a magnetic field on the superconducting qubit comprises a bias line that is magnetically coupled to the superconducting qubit. In some embodiments, the means for applying a magnetic field on the superconducting qubit is an excitation device. In some embodiments, $Φ_{RF}$ has a magnitude between about $10^{-5}Φ_0$ and about $10^{-1}Φ_0$. In some embodiments, the structure further comprises means for varying f(t), $Φ_A$, and/or $Φ_{RF}$. In some embodiments, the structure further comprises means for varying $Φ_{RF}$ in accordance with a small amplitude fast function. In some embodiments, the means for varying $Φ_{RF}$ in accordance with a small amplitude fast function is a microwave generator that is in electrical communication with the tank circuit.

In some embodiments in accordance with the fifth aspect of the present methods, the structure further comprises an amplifier connected across the tank circuit and means for measuring a total impedance of the tank circuit, expressed through the phase angle χ between driving current $I_{RF}$ and the tank voltage. In some embodiments, the means for measuring a total impedance of the tank circuit is an oscilloscope.

A sixth aspect of the present methods provides a computer program product for use in conjunction with a computer system. The computer program product comprises a computer readable storage medium and a computer program mechanism embedded therein. The computer program mechanism comprises instructions for initializing a quantum system comprising a plurality of superconducting qubits to an initialization Hamiltonian $H_O$. The quantum system is capable of being in one of at least two configurations at any give time. The at least two configurations include a first configuration characterized by the initialization Hamiltonian $H_O$ and a second configuration characterized by a problem Hamiltonian $H_P$. Each respective first superconducting qubit in the plurality of superconducting qubits is arranged with respect to a respective second superconducting qubit in the plurality of superconducting qubits such that the first respective superconducting qubit and the second respective superconducting qubit define a predetermined coupling strength. The predetermined coupling strengths between each of the first respective superconducting qubits and the second respective superconducting qubits collectively define a computational problem to be solved. The computer program mechanism further comprises instructions for adiabatically changing the quantum system until it is described by the ground state of the problem Hamiltonian $H_P$ and instructions for reading out the state of the quantum system.

In some embodiments in accordance with this sixth aspect of the present methods, the computer program mechanism further comprises instructions for repeating the instructions for biasing, instructions for adding, and instructions for adiabatically varying between 1 time and 100 times inclusive. The presence or absence of the voltage response of the tank circuit is observed as an average of the voltage response of the tank circuit to each instance of the instructions for adiabatically changing that are executed by the instructions for repeating.

A seventh aspect of the present methods comprises a computer program product for use in conjunction with a computer system. The computer program product comprises a computer readable storage medium and a computer program mechanism embedded therein. The computer program mechanism determines a quantum state of a first target superconducting qubit in a plurality of superconducting qubits. The computer program mechanism comprises instructions for initializing a plurality of superconducting qubits so that they are described by a problem Hamiltonian. The problem Hamiltonian describes (i) the quantum state of the plurality of superconducting qubits and (ii) each coupling energy between qubits in the plurality of qubits. The problem Hamiltonian is at or near a ground state. The computer program mechanism further comprises instructions for adding an rf-flux to the first target superconducting qubit. The rf-flux has an amplitude that is less than one flux quantum. The computer program mechanism further comprises instructions for adiabatically varying an amount of an additional flux in the first target superconducting qubit and observing a presence or an absence of a dip in a voltage response of a tank circuit that is inductively coupled with the first target superconducting qubit during the adiabatically varying.

In some embodiments in accordance with this seventh aspect of the present methods, each superconducting qubit in the plurality of superconducting qubits is in a quantum ground state during all or a portion of the instructions for initializing, instructions for adding, and the instructions for adiabatically varying. In some embodiments, the problem Hamiltonian corresponds to a terminus of an adiabatic evolution of the plurality of superconducting qubits. In some embodiments, the computer program product further comprises instructions for biasing all or a portion of the superconducting qubits in the plurality of superconducting qubits. In such embodiments, the problem Hamiltonian additionally describes the biasing on the qubits in the plurality of superconducting qubits. In some embodiments, an energy of the biasing exceeds the tunneling energy of a tunneling element of the Hamiltonian of a superconducting qubit in the plurality of superconducting qubits thereby causing tunneling to be suppressed in the superconducting qubit during an instance of the instructions for biasing, instructions for adding and the instructions for adiabatically varying.

In some embodiments in accordance with the seventh aspect of the present methods, the computer program mechanism further comprises instructions for adiabatically removing additional flux that was added to the first target superconducting qubit during the instructions for adiabatically varying. In some embodiments, the instructions for adiabatically varying comprise instructions for adiabatically varying the additional flux in accordance with a waveform selected from the group consisting of periodic, sinusoidal, triangular, and trapezoidal. In some embodiments, the instructions for adiabatically varying comprise instructions for adiabatically varying the additional flux in accordance with a low harmonic Fourier approximation of a waveform selected from the group consisting of periodic, sinusoidal, triangular, and trapezoidal. In some embodiments, the additional flux has a direction that is deemed positive or negative. In some embodiments, the instructions for adiabatically varying are characterized by a waveform that has an amplitude that grows with time and such that the amplitude of the waveform corresponds to an amount of additional flux that is added to the first target superconducting qubit during an instance of the instructions for adiabatically varying.

In some embodiments in accordance with the seventh aspect of the present methods, the additional flux has an equilibrium point that varies with time. In some embodiments, the additional flux is either unidirectional or bidirectional. In some embodiments, the additional flux has a frequency of oscillation between about 1 cycle per second and about 100 kilocycles per second. In some embodiments, the instructions for adding comprise instructions for adding the rf-flux using (i) an excitation device that is inductively coupled to the first target superconducting qubit or (ii) the tank circuit. In some embodiments, the computer program mechanism further comprises instructions for repeating the instructions for adding and the instructions for adiabatically varying between 1 time and 100 times. In such embodiments, the presence or absence of the voltage response of the tank circuit is observed as an average of the voltage response of the tank circuit across each instance of the instructions for adiabatically varying that is executed by the instructions for repeating.

An eighth aspect of the present methods comprises a computer system for determining a quantum state of a first target superconducting qubit in a plurality of superconducting qubits. The computer system comprises a central processing unit and a memory, coupled to the central processing unit. The memory stores instructions for biasing all or a portion of the qubits in the plurality of superconducting qubits other than the first target superconducting qubit. A problem Hamiltonian describes (i) the biasing on the qubits in the plurality of superconducting qubits and (ii) each coupling energy between respective superconducting qubit pairs in the plurality of superconducting qubits. The problem Hamiltonian is at or near a ground state. The memory further stores instructions for adding an rf-flux to the first target superconducting qubit. The rf-flux has an amplitude that is less than one flux quantum. The memory further stores instructions for adiabatically varying an amount of an additional flux in the first target superconducting qubit and observing a presence or an absence of a dip in a voltage response of a tank circuit that is inductively coupled with the first target superconducting qubit during a time when the instructions for adiabatically varying are executed.

A ninth aspect of the present methods provides a computation device for adiabatic quantum computing comprising a plurality of superconducting qubits. Each superconducting qubit in the plurality of superconducting qubits comprises two basis states associated with the eigenstates of a $\sigma^z$ Pauli matrix that can be biased. The quantum computation device further comprises a plurality of couplings. Each coupling in the plurality of couplings is disposed between a superconducting qubit pair in the plurality of superconducting qubits. Each term Hamiltonian for a coupling in the plurality of couplings has a principal component proportional to $\sigma^z \otimes \sigma^z$. The sign for at least one principal component proportional to $\sigma^z \otimes \sigma^z$ for a coupling in the plurality of couplings is antiferromagnetic. The superconducting qubits and the plurality of couplings are collectively capable of being in any one of at least two configurations. The at least two configurations include a first configuration characterized by an initialization Hamiltonian $H_0$ and a second Hamiltonian characterized by a problem Hamiltonian $H_P$. The problem Hamiltonian has a ground state. Each respective first superconducting qubit in the plurality of superconducting qubits is coupled with a respective second superconducting qubit in the plurality of superconducting qubits such that the first respective superconducting qubit and the corresponding second respective superconducting qubit define a predetermined coupling strength. The predetermined coupling strength between each of the first respective superconducting qubits and the corresponding second respective superconducting qubits collectively define a computational problem to be solved. The computation device further comprises a read out circuit coupled to at least one superconducting qubit in the plurality of superconducting qubits.

A tenth aspect of the present methods comprises an apparatus comprising a plurality of superconducting charge qubits. Each respective first superconducting charge qubit in the plurality of superconducting charge qubits is coupled with a respective second superconducting charge qubit in the plurality of superconducting charge qubits such that the first respective superconducting charge qubit and the second respective superconducting charge qubit define a predetermined coupling strength. The predetermined coupling strength between each of the first respective superconducting charge qubits and each of the second respective superconducting charge qubits in the plurality of superconducting charge qubits collectively define a computational problem to be solved. Each superconducting charge qubit in the plurality of superconducting charge qubits is capable of being in one of at least two configurations. These at least two configurations include a first configuration in accordance with an initialization Hamiltonian $H_0$ and a second configuration in accordance with a problem Hamiltonian $H_P$. The apparatus further comprises an electrometer coupled to a superconducting charge qubit in the plurality of superconducting charge qubits.

In some embodiments in accordance with this tenth aspect of the present methods, a superconducting charge qubit in the plurality of superconducting charge qubits comprises (i) a mesoscopic island made of superconducting material, (ii) superconducting reservoir, and (iii) a Josephson junction connecting the mesoscopic island to the superconducting reservoir. In some embodiments, the Josephson junction is a split Josephson junction. In some embodiments, the superconducting charge qubit further comprises a flux source configured to apply flux to the split Josephson junction.

In some embodiments in accordance with the tenth aspect of the present methods, the apparatus further comprises a generator capacitively coupled to a superconducting charge qubit in the plurality of superconducting charge qubits by a capacitor. In some embodiments, the generator is configured to apply a plurality of electrostatic pulses to the superconducting charge qubit. The plurality of electrostatic pulses additionally define the computational problem.

In some embodiments in accordance with the tenth aspect of the present methods, the apparatus further comprises a variable electrostatic transformer disposed between a first superconducting charge qubit and a second superconducting charge qubit in the plurality of superconducting charge qubits such that the predetermined coupling strength between the first superconducting charge qubit and the second superconducting charge qubit is tunable. In some embodiments, each respective first superconducting charge qubit in the plurality of superconducting charge qubits is arranged with respect to a respective second superconducting charge qubit in the plurality of superconducting charge qubits such that the plurality of superconducting charge qubits collectively form a nonplanar graph.

An eleventh aspect of the present methods provides a method for computing using a quantum system comprising a plurality of superconducting charge qubits. The quantum system is coupled to an electrometer and the quantum system is capable of being in any one of at least two configurations. The at least two configurations includes a first configuration characterized by an initialization Hamiltonian $H_0$ and a second configuration characterized by a problem Hamiltonian $H_P$. The problem Hamiltonian has a ground state. The plurality of superconducting charge qubits are arranged with respect to one another, with a predetermined number of couplings between respective pairs of superconducting charge qubits in the plurality of charge qubits, such that the plurality of superconducting charge qubits, coupled by the predetermined number of couplings, collectively define a computational problem to be solved. The method comprises initializing the quantum system to the initialization Hamiltonian $H_O$. Then the quantum system is adiabatically changed until it is described by the ground state of the problem Hamiltonian $H_P$. Next the quantum state of each superconducting charge qubit in the quantum system is read out through the electrometer, thereby solving the computational problem to be solved.

In some embodiments in accordance with the eleventh aspect of the present methods, a first superconducting charge qubit in the plurality of superconducting charge qubits is coupled to a second superconducting charge qubit in the plurality of superconducting charge qubits by a capacitor such that the predetermined coupling strength between the first superconducting charge qubit and the second superconducting charge qubit is predetermined and is a function of the physical properties of the capacitor.

In some embodiments in accordance with the eleventh aspect of the present methods, a first superconducting charge qubit in the plurality of superconducting charge qubits is coupled to a generator by a device configured to provide a tunable effective charging energy. The device comprises a capacitor and the method further comprises: tuning the value of the effective charging energy of the first superconducting charge qubit by varying the gate voltage on the capacitor of the device. In some embodiments, a superconducting charge qubit in the plurality of superconducting charge qubits comprises a split Josephson junction having a variable effective Josephson energy. In such embodiments, the method further comprises tuning the value of the effective Josephson energy of the superconducting charge qubit by varying a flux applied to the split Josephson junction. In some embodiments, the first configuration is reached by setting the effective Josephson energy of the superconducting charge qubit to a maximum value.

In some embodiments in accordance with the eleventh aspect of the present methods, the adiabatically changing comprises changing the configuration of the system from the first configuration characterized by the initialization Hamiltonian $H_0$, to the second Hamiltonian characterized by a problem Hamiltonian $H_P$ in the presence of tunneling on a superconducting charge qubit in the plurality of superconducting charge qubits.

In some embodiments in accordance with a eleventh aspect of the present methods, a first superconducting charge qubit in the plurality of superconducting charge qubits is characterized by (i) an effective Josephson energy that is tunable and (ii) an effective charging energy that is tunable. A minimum value of the effective Josephson energy is less than the effective charging energy of the first superconducting charge qubit. A minimum value of the effective Josephson energy is less than a strength of a coupling between the first superconducting charge qubit and a second superconducting charge qubit in the plurality of superconducting charge qubits. The effective charging energy is, at most, equal to a maximum value of the effective Josephson energy of the first superconducting charge qubit. Furthermore, a strength of a coupling between the first superconducting charge qubit and a second superconducting charge qubit in the plurality of superconducting charge qubits is, at most, equal to a maximum value of the effective Josephson energy of the first superconducting charge qubit.

In still another embodiment in accordance with the eleventh aspect of the present methods, a first superconducting charge qubit in the plurality of superconducting charge qubits is characterized by (i) an effective Josephson energy that is tunable and (ii) an effective charging energy that is tunable. In such embodiments, the adiabatically changing comprises adiabatically tuning the effective Josephson energy of the first superconducting charge qubit such that the effective Josephson energy of the first superconducting charge qubit reaches a minimum value when the quantum system is described by the ground state of the problem Hamiltonian $H_P$.

In some embodiments in accordance with the eleventh aspect of the present methods, a first superconducting charge qubit in the plurality of superconducting charge qubits has a first basis state and a second basis state and, when the quantum system is described by the ground state of the problem Hamiltonian $H_P$, tunneling between the first basis state and the second basis state of the first superconducting charge qubit does not occur.

In some embodiments in accordance with the eleventh aspect of the present methods, a first superconducting charge qubit in the plurality of superconducting charge qubits has a first basis state and a second basis state and, when the quantum system is described by the ground state of the problem Hamiltonian $H_P$, the tunneling between the first basis state and the second basis state of the first superconducting charge qubit does occur. Furthermore, the reading out comprises probing an observable of the sigma-x Pauli matrix $\sigma^x$.

In some embodiments in accordance with the eleventh aspect of the present methods, a first superconducting charge qubit in the plurality of superconducting charge qubits is characterized by (i) an effective Josephson energy that is tunable and (ii) an effective charging energy that is tunable. In such embodiments, a minimum value of the effective Josephson energy is less than the effective charging energy of the first superconducting charge qubit; a minimum value of effective Josephson energy is less than a strength of a coupling between the first superconducting charge qubit and a second superconducting charge qubit in the plurality of superconducting charge qubits; the effective charging energy is greater than a maximum value of the effective Josephson energy of the first superconducting charge qubit; and a strength of a coupling between the first superconducting charge qubit and a second superconducting charge qubit in the plurality of superconducting charge qubits is, at most, equal to the maximum effective Josephson energy of the first superconducting charge qubit. In some such embodiments, the initializing comprises setting the effective charging energy of the first superconducting charge qubit to a minimum value. In some such embodiments, the adiabatically changing comprises adiabatically tuning the effective Josephson energy of the first superconducting charge qubit such that the effective Josephson energy is at a minimum value when the quantum system is described by the ground state of the problem Hamiltonian $H_P$, and adiabatically increasing the effective charging energy of the first superconducting charge qubit.

In some embodiments in accordance with the eleventh aspect of the present methods, a first superconducting charge qubit in the plurality of superconducting charge qubits is characterized by an effective Josephson energy that is tunable. The initializing comprises setting the effective Josephson energy of the first superconducting charge qubit to a minimum value, and the adiabatically changing comprises (i) adiabatically tuning the effective Josephson energy of the first superconducting charge qubit such that the effective Josephson energy is greater than a minimum value for a period of time before the quantum system is described by the ground state of the problem Hamiltonian $H_P$, and adiabatically tuning the effective Josephson energy of the first superconducting charge qubit such that the effective Josephson energy is at a minimum value when the quantum system is described by the ground state of the problem Hamiltonian $H_P$.

In a twelfth aspect of the present methods, a quantum system comprising a plurality of superconducting qubits is initialized to a ground state of a first configuration, characterized by an initialization Hamiltonian $H_O$, and is adiabatically evolved to a ground state of a second configuration, defining a computational problem to be solved, characterized by a problem Hamiltonian $H_P$. During adiabatic evolution of the quantum system, the quantum system is characterized by an evolution Hamiltonian H that has an energy spectrum having at least one anticrossing. The adiabatic evolution comprises increasing the gap size of an anticrossing by changing a parameter of the quantum system.

In a thirteenth aspect of the present methods, a quantum system comprising a plurality of superconducting qubits is initialized to a ground state of a first configuration characterized by an initialization Hamiltonian $H_O$, and is adiabatically evolved to a ground state of a second configuration, defining a computational problem to be solved, characterized by a problem Hamiltonian $H_P$. During adiabatic evolution of the quantum system, the quantum system is characterized by an evolution Hamiltonian H that has an energy spectrum having at least one anticrossing. The adiabatic evolution comprises controlling the rate of adiabatic evolution via an evolution rate parameter $\gamma(t)$ that ranges between about 0 and 1, wherein the rate of change of the parameter is reduced during adiabatic evolution in a vicinity of an anticrossing.

In a fourteenth aspect of the present methods, a quantum system comprising a plurality of superconducting qubits is initialized to a ground state of a first configuration, characterized by an initialization Hamiltonian $H_O$ and is adiabatically evolved to a ground state of a second configuration, defining a computational problem to be solved characterized by a problem Hamiltonian $H_P$. During adiabatic evolution of the quantum system, the quantum system is characterized by an evolution Hamiltonian H that has an energy spectrum having at least one anticrossing. The adiabatic evolution comprises increasing the gap size of an anticrossing by changing a parameter of the quantum system and controlling the rate of adiabatic evolution via an evolution rate parameter $\gamma(t)$, where the rate of change of the parameter is reduced during the adiabatic evolution in the vicinity of an anticrossing.

BRIEF DESCRIPTION OF THE DRAWINGS

FIG. 3 illustrates a known general equation that describes the theory of adiabatic quantum computing.
FIGS. 6A-6B illustrate a graph of Hamiltonian coefficients during adiabatic computation in accordance with some embodiments of the present methods.

Like reference numerals refer to corresponding parts throughout the several views of the drawings.

DETAILED DESCRIPTION

Systems and methods for adiabatic quantum computing using superconducting qubits are provided. In various embodiments of the present methods, adiabatic quantum computing is performed on registers of superconducting qubits that have demonstrated quantum computing functionality. Adiabatic quantum computing is a model of quantum computing that can be used to attempt to find solutions for computationally difficult problems.

General Embodiments

When choosing a candidate system for adiabatic quantum computing there are some criteria may be observed. One criterion is that the readout device may be a Stern-Gerlach $\sigma^z$ type observation. A second criterion is that the tunneling term in the problem Hamiltonian may be about zero. For $H_P = \Delta\sigma^x + \epsilon\sigma^z$ then $\Delta \approx 0$. A third criterion is that the magnitude of the tunneling term in the problem, initial, or extra Hamiltonian ($H_P$, $H_O$, $H_E$) may be tunable. A fourth criterion is that the qubit-qubit coupling may be diagonal in the basis of final qubit states, i.e., $\sigma^z \otimes \sigma^z$. Because an Ising model with ferromagnetic couplings has a trivial ground state, all spins aligned, a fifth criterion is that the system may have some antiferromagnetic (AFM) coupling between qubits. Some AFM couplings include the case where all are antiferromagnetic. Also, ferromagnetic (FM) couplings have a negative sign $-J\sigma^Z \otimes \sigma^Z$, and antiferromagnetic couplings have a positive sign $J\sigma^Z \otimes \sigma^Z$.

Some embodiments of the present methods adhere to the above criteria, where other embodiments do not. It is possible to have the tunneling term in the problem Hamiltonian be, not zero, but weak, for phase qubits, e.g., for $H_P = \Delta\sigma^X + \epsilon\sigma^Z$ then $\Delta \ll \epsilon$. In such a case it is possible for the readout device to probe a Stern-Gerlach $\sigma^X$ type observable. Other embodiments of superconducting adiabatic quantum computers of the present methods do not adhere to the third criterion described above where, for example, the magnitude of the tunneling term in the problem, initial, or extra Hamiltonian ($H_P$, $H_0$, $H_E$) is fixed but the contribution of the problem, initial, or extra Hamiltonian to the instant Hamiltonian is tunable in such embodiments. Specific embodiments of the present methods are described below.

Exemplary General Procedure

Figure 4:
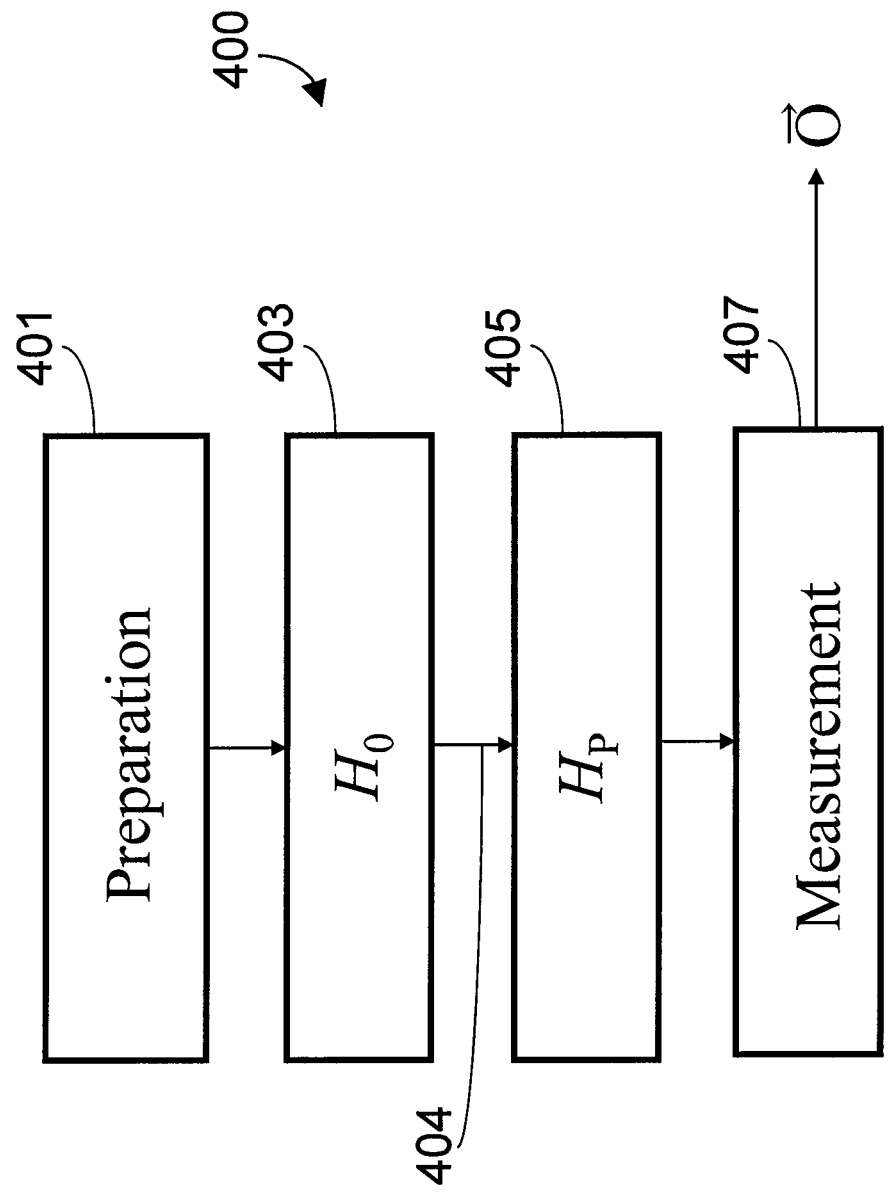
FIG. 4 illustrates a work flow diagram for a process of adiabatic quantum computing.

In accordance with embodiments of the present methods, the general procedure of adiabatic quantum computing is shown in FIG. 4. At 401, a quantum system that will be used to solve a computation is selected and/or constructed. In some embodiments, each problem or class of problems to be solved requires a custom quantum system designed specifically to solve the problem. Once a quantum system has been chosen, an initial state and a final state of the quantum system need to be defined. The initial state is characterized by the initial Hamiltonian $H_0$ and the final state is characterized by the final Hamiltonian $H_P$ that encodes the computational problem to be solved. In some embodiments, the quantum system is initiated to the ground state of the initial Hamiltonian $H_0$ and, when the system reaches the final state, it is in the ground state of the final Hamiltonian $H_P$. More details on how systems are selected and designed to solve a computational problem are described below.

At 403, the quantum system is initialized to the ground state of the time-independent Hamiltonian, $H_0$, which initially describes the quantum system. It is assumed that the ground state of $H_0$ is a state to which the system can be reliably reproduced.

In transition 404 between acts 403 and 405, the quantum system is acted upon in an adiabatic manner in order to alter the system. The system changes from being described by Hamiltonian $H_0$ to a description under $H_P$. This change is adiabatic, as defined above, and occurs in a period of time T. In other words, the operator of an adiabatic quantum computer causes the system, and Hamiltonian H describing the system, to change from $H_0$ to a final form $H_P$ in time T. The change is an interpolation between $H_0$ and $H_P$. The change can be a linear interpolation:

$$H(t) = (1-\gamma(t))H_0 + \gamma(t)H_P$$

where the adiabatic evolution parameter, $\gamma(t)$, is a continuous function with $\gamma(t=0)=0$, and $\gamma(t=T)=1$. The change can be a linear interpolation, $\gamma(t)=t/T$ such that $$H(t/T) = (1-t/T)H_0 + t/TH_P.$$

In accordance with the adiabatic theorem of quantum mechanics, a system will remain in the ground state of H at every instance the system is changed and after the change is complete, provided the change is adiabatic. In some embodiments of the present methods, the quantum system starts in an initial state $H_0$ that does not permit quantum tunneling, is perturbed in an adiabatic manner to an intermediate state that permits quantum tunneling, and then is perturbed in an adiabatic manner to the final state described above.

At 405, the quantum system has been altered to one that is described by the final Hamiltonian. The final Hamiltonian $H_P$ can encode the constraints of a computational problem such that the ground state of $H_P$ corresponds to a solution to this problem. Hence, the final Hamiltonian is also called the problem Hamiltonian $H_P$. If the system is not in the ground state of $H_P$, the state is an approximate solution to the computational problem. Approximate solutions to many computational problems are useful and such embodiments are fully within the scope of the present methods.

At 407, the system described by the final Hamiltonian $H_P$ is read out. The read out can be in the $\sigma^Z$ basis of the qubits. If the read out basis commutes with the terms of the problem Hamiltonian $H_p$, then performing a read out operation does not disturb the ground state of the system. The read out method can take many forms. The object of the read out is to determine exactly or approximately the ground state of the system. The states of all qubits are represented by the vector $\vec{O}$, which gives a concise image of the ground state or approximate ground state of the system. The read out method can compare the energies of various states of the system. More examples are given below, making use of specific qubits for better description.

Changing a Quantum System Adiabatically

In one embodiment of the present methods, the natural quantum mechanical evolution of the quantum system under the slowly changing Hamiltonian H(t) carries the initial state $H_0$ of the quantum system into a final state, which may be the ground state of $H_P$ in some embodiments, corresponding to the solution of the problem defined by the quantum system. A measurement of the final state of the quantum system reveals the solution to the computational problem encoded in the problem Hamiltonian. In such embodiments, an aspect that can define the success of the process is how quickly (or slowly) the change between the initial Hamiltonian and problem Hamiltonian occurs. How quickly one can drive the interpolation between $H_0$ and $H_P$, while keeping the system in the ground state of the instantaneous Hamiltonians that the quantum system traverses through in route to $H_P$, is a determination that can be made using the adiabatic theorem of quantum mechanics. This section provides a detailed explanation of the adiabatic theorem of quantum mechanics. More particularly, this section describes how quantum mechanics imposes constraints on which quantum systems can be used in accordance with the present methods and how such quantum systems can be used to solve computational problems using the present methods.

A quantum system evolves under the Schrödinger equation:

$$i\frac{\partial}{\partial t}|\psi(t)\rangle = \Theta(t)H(t)|\psi(t)\rangle,$$

where $\Theta(t)$ and H(t) are respectively the time ordering operator and Hamiltonian of the system. Adiabatic evolution is a special case where H(t) is a slowly varying function. The time dependent basis states and energy levels of the Hamiltonian are:

$$H(t)|l;t\rangle = E_l(t)|l;t\rangle$$

where $l \in [0, N-1]$, and N is the dimension of the Hilbert space for the quantum system described by the Schrödinger equation. The energy levels, energies, or energy spectra of the quantum system $E_I(t)$ are a set of energies that the system can occupy. The energies of the states are a strictly increasing set.

A general example of the adiabatic evolution of a quantum system is as follows. The states $|0;t\rangle$ and $|1;t\rangle$ are respectively the ground and first excited states of Hamiltonian H(t), with energies $E_0(t)$ and $E_1(t)$. Gap g(t) is the difference between energies of the ground and first excited states as follows:

$$g(t)=E_1(t)-E_0(t).$$

If the quantum system is initialized in the ground state and evolved under H(t), where H(t) is slowly varying, and if the gap is greater than zero, then for $0 \leq t \leq T$ the quantum system will remain in the ground state. In other words:

$$|\langle E_0;T|\psi(T)\rangle|^2 \geq 1-\epsilon^2.$$

Without intending to be limited to any particular theory, it is believed that the existence of the gap means that the quantum system under the Schrödinger equation remains in the ground state with high fidelity, e.g., $1-\epsilon^2$ ($\epsilon \ll 1$). The fidelity of the operation can be found quantitatively.

The minimum energy gap between the ground state $E_0$ and first excited state $E_1$ of the instantaneous Hamiltonian is given by $g_{min}$ where:

$$g_{min} = \min_{0 \leq t \leq T} [E_1(t) - E_0(t)].$$

Also relevant is the matrix element:

$$\left\langle \frac{dH}{dt} \right\rangle_{1,0} = \left\langle E_1;t \left| \frac{dH}{dt} \right| E_0;t \right\rangle.$$

The adiabatic theorem asserts fidelity of the quantum system will be close to unity provided that:

$$\frac{\left|\left\langle \frac{dH}{dt} \right\rangle_{1,0}\right|}{g_{min}^2} \leq \varepsilon$$

If this criterion is met, the quantum system will remain in the ground state.

In an embodiment of the present methods, T is the time taken to vary a control parameter of a charge qubit, for example induced gate charge or flux for a charge qubit with split Josephson junction. In an embodiment of the present methods, time T is a value between about 0.1 nanosecond and about 500 microseconds. In other words, the amount of time between when the quantum system is allowed to begin adiabatically changing from the initial state $H_0$ to when the quantum system first reaches the final state $H_P$ is between about 0.1 nanosecond and about 500 microseconds. In an embodiment of the present methods, time T is a value less than the inverse of the characteristic frequency of the physical system comprising superconducting qubits. The characteristic frequency of a qubit is the energy difference between a ground state and an excited state of a qubit. Thus, the characteristic frequency of a physical system comprising qubits is the characteristic frequency of one or more qubits within the physical system.

In an embodiment of the present methods, T is the time taken to vary a control parameter of a phase qubit, for example flux in a persistent current qubit. In an embodiment of the present methods, time T is a value between about 0.1 nanosecond and about 500 microseconds. In other words, the amount of time between when the quantum system is allowed to begin adiabatically changing from the initial state $H_0$ to when the quantum system first reaches the final state $H_P$ is between about 0.1 nanosecond and about 500 microseconds. In some embodiments, the time T is calculated as the time at which a Landau-Zener transition is likely not to occur. For more information on Landau-Zener transitions see, for example, Garanin et al., 2002, *Phys. Rev. B* 66, 174438.

Application of Landau-Zener Theory

Most analyses of adiabatic algorithms emphasize how the gap, g(t), and the ratio of the matrix element $\langle dH/dt \rangle_{1,0}$ to the square of the minimum of the gap, scale with increasing problem size. It is believed that, by examining these metrics, the validity of adiabatic algorithms, and other adiabatic processes, can be determined. Some embodiments of the present methods make use of an alternative analysis that looks at the probability of transition 404, or some other process, being diabatic (i.e. a process that involves heat transfer as opposed to an adiabatic process that involves no heat transfer). Rather than calculating the minimum gap, which is the difference between the energy of the ground and the first excited state of a quantum system that models the problem to be solved, this additional analysis calculates the probability of a transition out of the ground state by the quantum system. In examples of the present methods, this probability calculation can be a more relevant metric for assessing the failure rate of the adiabatic algorithm or process. To perform the computation, it is assumed that any diabatic transition (any transition characterized by the transfer of heat) is a Landau-Zener transition, e.g., a transition confined to adjacent levels at anticrossings. A description of anticrossing levels is provided below in conjunction with FIGS. 9A and 9B. When the state of a plurality of qubits approaches an anticrossing, the probability for a transition out of the ground state can be parameterized by (i) the minimum of the gap, $g_{min}$, (ii) the difference in the slopes, $\Delta_m$, of the asymptotes for the energy levels of the qubit or plurality of qubits undergoing adiabatic change (e.g., quantum system 850 of FIG. 8), and (iii) the rate of change of the adiabatic evolution parameter, $d\gamma/dt=\dot{\gamma}$. The first estimate of the Landau-Zener transition probability is:

$$P_{LZ} = e^{-2\pi\eta}; \eta = \frac{1}{4\hbar} \frac{g_{min}}{|\Delta_m|\dot{\gamma}}.$$

The values for the parameters $g_{min}$, and $\Delta_m$ will vary with the specific instance of the algorithm being run on an adiabatic quantum computer.

Other embodiments of the present methods can be constructed and operated with a different estimate for the probability of a diabatic transition at 404. For instance, in some embodiments the second estimate of the Landau-Zener transition probability is computed. This probability has the form:

$$P'_{LZ} = e^{-2\pi k \vartheta}; \vartheta = \frac{1}{\hbar} \frac{g_{min}^2}{E_J f_P},$$

where k is a constant that is about 1, $E_J$ is the Josephson energy of the qubit (or maximum Josephson energy of the Josephson energies of a plurality of qubits), and $f_P$ is frequency of oscillation of an additional flux that is added to the superconducting qubit. The values for the parameters $g_{min}$ and $E_J$ will vary with the specific instance of the algorithm being run on the adiabatic quantum computer.

In many embodiments of the present methods, quantum systems for adiabatic quantum computation are designed such that the minimum of the energy gap, the difference in the asymptotic slopes, and the rate of change of the adiabatic evolution parameter ensure that the probability of diabatic transition at 404 is small, e.g. $P_{LZ}$ is much smaller than 1. In an embodiment of the present methods, $P_{LZ}$ is $1 \times 10^{-3}$ or less. The probability of transition from the ground state of the quantum system to the first excited state of the quantum system is exponentially sensitive to the rate of change of the adiabatic evolution and provides a lower bound to that rate. The probability of transition from the ground state of the quantum system to the first excited state of the quantum system also provides an upper limit on rate of change of the adiabatic evolution parameter. The duration of an adiabatic algorithm, or process, may be less than the time it takes for a Landau-Zener transition to occur. If $P_{LZ}$ is the probability per anticrossing, then the quantum system (e.g., quantum system 850 of FIG. 8, which can be an individual qubit or a plurality of qubits) may be designed and operated such that the following inequality is satisfied: $P_{LZ} \times n_A \ll 1$, where $n_A$ is the number of anticrossings traversed in time T, or $T \ll (P_{LZ} \times \dot{\gamma} \times \rho_A)^{-1}$, where $\rho_A$ is the density of anticrossings along the ground state of the energy spectra. The density of the anticrossings and crossings along the ground state can be calculated by an approximate evaluation method.

In some embodiments of the present methods, the amount of time required to perform the readout process may be engineered so that the probability that quantum system 850 will transition from the ground state to the first excited state is small. In one embodiment, the probability less than one percent. For a readout process, the following should hold: $P_{LZ} \times m \times r \ll 1$, or $\tau \ll f_A \times (P_{LZ} \times m)^{-1}$, where m is the number of qubits, and r is the average number of cycles used to readout the qubits, $f_A$ is the frequency of the cycles used to readout the qubits, and $\tau$ is the time for the readout of one qubit in a plurality of m qubits.

In an embodiment of the present methods this requisite small probability for transition $P_{LZ}$ is dependent on the process performed. In the case of a readout process that applies additional flux to a superconducting qubit and measures the state through a tank circuit, such as the embodiment described in detail below in conjunction with FIG. 8, the value of "small" is dependent on the number of cycles (r) of the waveform of the additional flux used. For example, in an embodiment of the present methods that reads out one qubit in one cycle, a small $P_{LZ}$ value is $1 \times 10^{-2}$ or less. In an embodiment of the present methods that reads out n qubits in r cycles, a small $P_{LZ}$ value is $(r \times n)^{-1} \times 10^{-2}$ or less. The cumulative probability of transition over the adiabatic process and subsequent readout cycles may be small and the system designed and operated accordingly. In an embodiment of the present methods, a small cumulative probability of transition is about $1 \times 10^{-2}$.

Speed-Up of Adiabatic Evolution

In some embodiments of the present methods, the time T it takes for the quantum system to evolve from $H_0$ to $H_P$ may be minimized. As mentioned previously, Landau-Zener transitions are the main cause of excitation from the instantaneous ground state during adiabatic quantum evolution. Landau-Zener transitions occur in the vicinity of anticrossings in the energy spectra of the state of the quantum system undergoing adiabatic evolution. If the state of the quantum system passes through the anticrossing too quickly during adiabatic evolution, there is a large probability of exciting the state of the quantum system, resulting in a superposition of states rather than the ground state of the Hamiltonian $H_P$ at the end of the evolution. However, anticrossings involving the ground state do not occur often in the energy spectra of the quantum system, and therefore it is not necessary for the entire adiabatic evolution to be limited to a rate commensurate with avoiding Landau-Zener transitions at anticrossings.

The adiabatic evolution can be expressed as $$H(t) = (1-\gamma(t))H_0 + \gamma(t)H_P$$

where $\gamma(t)$ is a time-dependent adiabatic evolution parameter that changes in value as the quantum system adiabatically evolves from the ground state of a first configuration characterized by the initialization Hamiltonian $H_O$ to the ground state of a second configuration characterized by the Hamiltonian $H_P$. At the beginning of the adiabatic evolution, when the quantum system is in the ground state of the first configuration, $\gamma(t)$ has a value of 0. At the end of the adiabatic evolution, when the quantum system is in the ground state of the second configuration (the problem configuration), $\gamma(t)$ has a value of 1. In typical embodiments, at all other time points during the adiabatic evolution, $\gamma(t)$ has a value somewhere between or including 0 and 1. In the present methods, the rate of change of $\gamma(t)$ over the course of the adiabatic evolution is reduced when the state of the quantum system described by $H(t)$ is in the vicinity of an anticrossing and the rate of change of $\gamma(t)$ is increased when the state of the quantum system is not in the vicinity of an anticrossing.

In some embodiments of the present methods, adiabatic evolution is slowed down at time points during the time course of the adiabatic evolution during which the state of the quantum system is in the vicinity of anticrossings. The edges of such time intervals, which demark when the state of the quantum system is in the vicinity of such anticrossings, may be determined by a statistical analysis of various problem Hamiltonians $H_P$. For each problem Hamiltonian $H_P$, a range of values in the adiabatic evolution time course where an anticrossing is likely to occur is determined. By analyzing a variety of problem Hamiltonians with different numbers of qubits and with varying values of local qubit biases and coupling strengths, the time intervals during which the state of the quantum system is, on average, in the vicinity of an anticrossing may be determined. Within such averaged time intervals there is a large probability of an anticrossing being present, independent of the specific problem Hamiltonian. Each such averaged time interval constitutes the vicinity of an anticrossing where there is a high probability that an anticrossing occurs. Thus, adiabatic evolution can proceed relatively quickly when not in such a time interval and only slow down in the vicinity of an anticrossing.

In some embodiments, slowing down the adiabatic evolution comprises slowing down (decreasing) the rate that the parameter $\gamma(t)$ changes as it proceeds from $\gamma(t)=0$ to $\gamma(t)=1$. In some embodiments, the adiabatic evolution slows down the transition from $\gamma(t)=0$ to $\gamma(t)=1$ around the value $\gamma(t)=0.5$. In one embodiment, the rate of change of the function $\gamma(t)$ is decreased when the value of the parameter $\gamma(t)$ is within ten percent or less of the value that the parameter $\gamma(t)$ has at a given anticrossing.

Slowing down the rate of change in the parameter $\gamma(t)$ may comprise slowing down the rate at which the coupling strengths between qubits are changed, the rate at which local biases on qubits are changed, and/or the rate at which the tunneling amplitude is changed. In some embodiments, the rate of change of adiabatic evolution parameter $\gamma(t)$ ($\partial\gamma(t)/\partial t$) may be decreased (slowed down) by an approximate factor of two to ten in the vicinity of an anticrossing compared to when the state of the quantum system is not in the vicinity of an anticrossing.

Another method of increasing the speed of the adiabatic evolution is to multiply the superposition of Hamiltonians by a global function. This has the effect of increasing the gap size of the anticrossing, thereby decreasing the probability of the quantum system undergoing a Landau-Zener transition. The probability of a Landau-Zener transition is exponentially proportional to the square of the gap size, so the probability of staying in the ground state can increase significantly with a small increase in gap size. Therefore, the adiabatic evolution does not have to proceed as slowly through the anticrossing. An example of this method is shown using the Hamiltonian:

$$H(t)=[(1-\gamma(t))H_0+\gamma(t)H_P]\cdot[1+\Gamma(\gamma(t)-\gamma(t)_m)]$$

where $\gamma(t)$ is the adiabatic evolution parameter, $\gamma(t)_m$ is the value of $\gamma(t)$ at an anticrossing, and $\Gamma(\gamma)$ is a global function dependent on the evolution parameter. The function $\Gamma(\gamma)$ is at its maximum when $\gamma(t)=\gamma(t)_m$ and drops off to zero when $\gamma(t)$ is 0 or 1. An example of such a function is a Gaussian-like function centered on $\gamma(t)_m$. Another example of a global function is shown below:

$$1+\Gamma(\gamma)=\frac{\theta(\gamma(t)_m-\gamma(t))}{1-\gamma(t)}+\frac{\theta(\gamma(t)-\gamma(t)_m)}{\gamma(t)}$$

where $\theta(x)$ is a step function which equals 0 for $x<0$ and equals 1 for $x>0$. This global function does not shift the position of the anticrossing whereas other forms of the global function can, making it easier to specify the vicinity of the anticrossing.

Physically, multiplying the Hamiltonian by the factor $(1+\Gamma(\gamma))$ involves changing one or more bias parameters in the quantum system. Such bias parameters include the energy corresponding to the individual flux or charge bias on each qubit, the tunneling term in each qubit, and the coupling strength between qubits. Multiplying the Hamiltonian by the factor $(1+\Gamma(\gamma))$ simply scales each of these parameters by the same amount. Therefore, to physically implement the factor $(1+\Gamma(\gamma))$ it is only necessary to increase the individual bias, tunneling term, and coupling strength by the same factor. Methods of tuning these parameters are known in the art and are described in other sections of the specification.

FIG. 6A shows the coefficients of $H_0$ and $H_P$, and $(1-\gamma(t))$ and $\gamma(t)$ respectively during an adiabatic evolution where $\gamma(t)$ is a linear function. The initial Hamiltonian $H_0$ linearly decreases to zero with time while the final Hamiltonian $H_P$ linearly increases to its maximum value with time. As an example, the anticrossing is arbitrarily placed at $\gamma(t)=0.5$. FIG. 6B shows the same situation as FIG. 6A except that $\gamma(t)$ is nonlinear and the coefficients are multiplied by the factor $(1\Gamma(\gamma))$. Note that near $\gamma(t)=0.5$, both curves increase in amplitude, which is a result of increasing the amplitude of both $H_0$ and $H_P$ in the total Hamiltonian. This effect is caused by the factor $(1+\Gamma(\gamma))$, and as a consequence the gap spacing of the anticrossing at $\gamma(t)=0.5$ is increased, thereby reducing the probability of excitations out of the instantaneous ground state. The factor by which $(1+\Gamma(\gamma))$ can increase the gap size is limited due to physical constraints of the system.

In some embodiments of the present methods, the function $\Gamma(\gamma)$ is a Gaussian-like function. In other embodiments, the function $\Gamma(\gamma)$ is a function that increases the amplitude of both $H_0$ and $H_P$ as the evolution approaches an anticrossing and decreases the amplitude of both $H_0$ and $H_P$ after the evolution passes an anticrossing. In some embodiments, the ground state of $H_P$ may be non-degenerate. The factor $(1+\Gamma(\gamma))$ may be implemented by changing the individual bias of the qubits, the tunneling term of the qubits, and/or the coupling strength between qubits by the same factor.

In some embodiments of the present methods, both methods of speeding up the adiabatic evolution described above may be used in conjunction. That is, the gap size of an anticrossing is increased and the speed of adiabatic evolution is reduced in the vicinity of the anticrossing.

Exemplary Embodiments

The following describes embodiments of quantum systems capable of conducting adiabatic quantum computing.

Figure 5A:
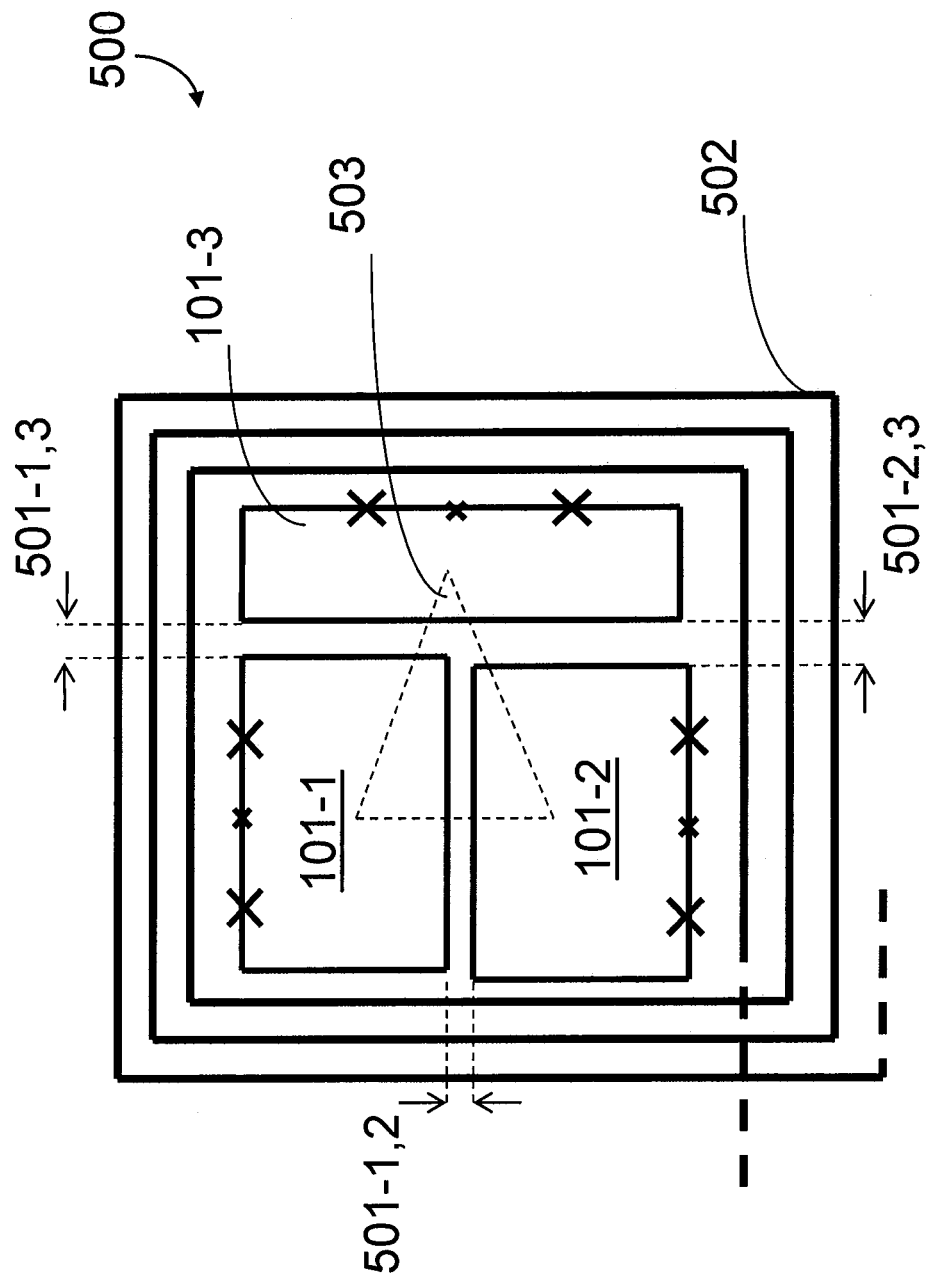
FIGS. 5A-5E illustrates arrangements of superconducting qubits for adiabatic quantum computing in accordance with some embodiments of the present methods.

Finding the Ground State of a Frustrated Ring Adiabatically Using a Persistent Current Qubit Quantum System FIG. 5A illustrates a first example of a quantum system 500 in accordance with an embodiment of the present methods. Three coupled flux qubits are dimensioned and configured in accordance with the present methods such that system 500 is capable of finding the ground state of a frustrated quantum system using adiabatic computing methods.

General Description of the Persistent Current Qubit Quantum System Used in Exemplary Embodiments Referring to FIG. 5A, each qubit 101 in quantum system 500 includes a superconducting loop with three small-capacitance Josephson junctions in series that enclose an applied magnetic flux $f\phi_o$ ($\phi_o$ is the superconducting flux quantum h/2e, where h is Planck's constant) and f is a number that can range from 0 (no applied flux) to 0.5 or greater. Each Josephson junction is denoted by an "x" within the corresponding superconducting loop. In each qubit 101, two of the Josephson junctions have equal Josephson energy $E_J$, whereas the coupling in the third junction is $\alpha E_J$, with $0.5<\alpha<1$. Each qubit 101 has two stable classical states with persistent circulating currents of opposite sign. For f=0.5, the energies of the two states are the same. The barrier for quantum tunneling between the states depends strongly on the value of a. Qubits 101 having the design illustrated in FIG. 5A has been proposed by Mooij et al., 1999, Science 285, 1036. The design and manufacture of such qubits is further discussed in Section 2.2.1, above.

The two stable states of a qubit 101 will have equal energy, meaning that they will be degenerate, and will therefore support quantum tunneling between the two equal energy states (basis states) when the amount of flux trapped in the qubit is $0.5\phi_o$. The amount of flux required to trap $0.50\phi_o$ in a qubit 101 is directly proportional to the area of the qubit, defined here as the area enclosed by the superconducting loop of the qubit. If the amount of flux needed to achieve a trapped flux of $0.50\phi_o$ in a first qubit 101 having area $A_1$ is $B_1$, then the amount of flux that is needed to trap $0.5\phi_o$ of flux in a second qubit having area $A_2$ is $(A_2/A_1)B_1$. Advantageously, in system 500, each qubit 101 has the same total surface area so that an external mechanism (e.g., a tank circuit) can cause each respective qubit 101 in system 500 to trap $0.50\phi_o$ of flux at approximately or exactly the same time.

In some embodiments, the three persistent current qubits, 101-1, 101-2, and 101-3 in structure 500 are inductively coupled to a tank circuit (not fully shown in FIG. 5A). This tank circuit is comprised of both inductive and capacitive circuit elements. The tank circuit is used to bias qubits 101 such that they each trap $0.5\phi_o$ of flux. In some embodiments of the present methods, the tank circuit has a high quality factor (e.g., Q>1000) and a low resonance frequency (e.g., a frequency less between 6 to 30 megahertz). The role of a tank circuit as a qubit control system is detailed in United States Patent Publication 2003/0224944 A1, entitled "Characterization and measurement of superconducting structures," which is hereby incorporated by reference in its entirety, as well as Il'ichev et al., 2004, "Radio-Frequency Method for Investigation of Quantum Properties of Superconducting Structures," arXiv.org: cond-mat/0402559; and Il'ichev et al., 2003, "Continuous Monitoring of Rabi Oscillations in a Josephson Flux Qubit," *Phys. Rev. Lett.* 91, 097906. An inductive element of a tank circuit is shown in FIG. 5A as element 502. In some embodiments, inductive element 502 is a pancake coil of superconducting material, such as niobium, with a nominal spacing of 1 micrometer between each turn of the coil. The inductive and capacitive elements of the tank circuit can be arranged in parallel or in series. For a parallel circuit, a useful set of values for a small number of qubits is an inductance of about 50 nanohenries to about 250 nanohenries, a capacitance of about 50 picofarads to about 2000 picofarads, and a resonance frequency of about 10 megahertz to about 20 megahertz. In some embodiments, the resonance frequency $f_T$ is determined by the formula $f_T = \omega_T/2\pi = 1/\sqrt{L_T C_T}$ where $L_T$ is the inductance and $C_T$ is the capacitance of the tank circuit.

Selection of Persistent Current Qubit Device Parameters

In some embodiments of the present methods, qubit parameters are chosen to satisfy the requirements of the problem to be solved by adiabatic quantum computation and the restrictions of the qubits. For a persistent current qubit, the tunneling term is always non-zero and often non-variable. This presents a problem because in some embodiments a problem Hamiltonian $H_P$ is chosen for 403 of FIG. 4 that does not permit quantum tunneling to occur. Yet, in the case of persistent current qubits, a state that does not permit quantum tunneling cannot be found because in such qubits the tunneling term is always non-zero. It is not necessary to have the tunneling term absent from the problem Hamiltonian $H_P$ or the initial Hamiltonian $H_0$. In some embodiments of the present methods permit a non-zero tunneling term in $H_P$ and or/or $H_0$ for any combination of the following reasons: (i) the tunneling term leads to anticrossing useful for read out processes and (ii) the requirement of non-tunneling term is deemed to be too strict in such embodiments. As to the latter point, it is sufficient to have a coupling term that is much stronger than the tunneling term in some embodiments of the present invention.

In one particular embodiment of a qubit 101 in quantum system 500 (FIG. 5A), the critical current density of the Josephson junctions is about 1000 amperes per centimeter squared. The largest and strongest junction of each qubit 101 in system 500 has an area of about 450 nanometers by about 200 nanometers. The capacitance of the largest junction is about 4.5 femtofarads and the ratio between the Josephson energy and the charging energy is about 100. The charging energy in such embodiments is $e^2/2C$. The ratio between the weakest and strongest Josephson junction is 0.707:1. The tunneling energies of qubits 101 in this embodiment are each about 0.064 Kelvin. The persistent current is 570 nanoamperes. For this value of the persistent current and for inter-qubit mutual inductances taken from the design of FIG. 5A, the coupling energies between the qubits are $J_{1,2}$=0.246 Kelvin, $J_{2,3}$=0.122 Kelvin, and $J_{1,3}$=0.059 Kelvin. All these parameters are within reach of current fabrication technology. The specific values for this exemplary embodiment are provided by way of example only and do not impose any limitation on other embodiments of a system 500.

Various embodiments of the present invention provide different values for the persistent current that circulates in persistent current qubits 101. These persistent currents range from about 100 nanoamperes to about 2 milliamperes. The persistent current values change the slope of the asymptotes at anticrossing 915 (FIG. 9A). Specifically, the qubit bias is equal to $\pi I_P(2\Phi_E/\Phi_0-1)$, where $I_P$ is the persistent current value and the slope of the asymptote (e.g., asymptote 914 and/or 916) is proportional to the qubit bias, for large bias, when such bias is about 10 times the tunneling energy. In some embodiments of the present methods, qubits 101 have a critical current density of about 100 A/cm² to about 2000 A/cm². In some embodiments of the present methods, qubits 101 have a critical current that is less than about 600 nanoamperes. In some embodiments of the present methods, the term "about" in relation to critical current means a variance of up to ±50% of the stated value.

Algorithm Used to Solve the Computational Problem

Act 401 (Preparation).

An overview of an apparatus 500 used to solve a computational problem in accordance of the present methods has. In this section, the general adiabatic quantum computing process set forth in FIG. 4 is described. The problem to be solved is finding or confirming the ground state or final state of a three node frustrated ring. System 500 is used to solve this problem. Entanglement of one or more qubits 101 is achieved by the inductive coupling of flux trapped in each qubit 101. The strength of this type of coupling between two qubits is, in part, a function of the common surface area between the two qubits. Increased common surface area between abutting qubits leads to increased inductive coupling between the two abutting qubits.

In accordance with the present methods, the problem of determining the ground state of the three node frustrated ring is encoded into system 500 by customizing the coupling constants between neighboring qubits 101 using two variables: (i) the distance between the qubits and (ii) the amount of surface area common to such qubits. The lengths and widths of qubits 101, as well as the spatial separation between such qubits, are adjusted to customize inter-qubit inductive coupling strengths in such a way that these coupling strengths correspond to a computational problem to be solved (e.g., the ground state or final state of a three member frustrated ring). In some embodiments, qubit 101 length and width choices are subject to the constraint that each qubit 101 have the same or approximately the same total surface area so that the qubits can be adjusted to a state where they each trap half a flux quantum at the same time.

As shown in FIG. 5A, the configuration of qubits 101 represents a ring with inherent frustration. The frustrated ring is denoted by the dashed triangle in FIG. 5A through qubits 101. Each two qubits of the set {101-1, 101-2, 101-3} has a coupling that favors anti-ferromagnetic alignment, i.e. adjacent qubits exist in differing basis states. Because of the presence of the odd third qubit and the asymmetry that results from the odd third qubit, system 500 does not permit such an alignment of coupling. This causes system 500, in this embodiment a ring-like configuration of an odd number of qubits, to be frustrated. Referring to FIG. 5A, in an embodiment of the methods, the area of each qubit 101 is approximately equal. In one embodiment, persistent current qubits, such as qubits 101, with an area of about 80 micrometers squared (e.g. height of about 9 micrometers and width of about 9 micrometers, height of 4 micrometers and width of 40 micrometers, etc.) are arranged with two congruent qubits paired lengthwise (e.g., 101-1 and 101-2) and a third non-congruent qubit (e.g., 101-3) laid transverse and abutting the end of the pair, as shown in FIG. 5A.

All three qubits 101-1, 101-2 and 101-3, have the same area subject to manufacturing tolerances. In some embodiments of the present methods, such tolerance allows for up to a ±25% deviation from the mean qubit surface area. Qubits 101-1, 101-2 and 101-3 are coupled to each other asymmetrically. In other words, the total surface area common to qubit 101-3 and 101-1 (or 101-2) is less than the total surface area common to qubit 101-1 and 101-2.

Embodiments of the present methods, such as those that include a system like 500, have the Hamiltonian:

$$H = \sum_{i=1}^{N} [\varepsilon_i \sigma_i^Z + \Delta_i \sigma_i^X] + \sum_{i=1}^{N} \sum_{j>i}^{N} J_{ij} \sigma_i^Z \otimes \sigma_j^Z$$

where N is the number of qubits. The quantity $\Delta_i$ is the tunneling rate, or energy, of the $i^{th}$ qubit expressed in units of frequency, or energy. These unit scales differ by a factor of h or Plank's constant. The quantity $\varepsilon_i$ is the amount of bias applied to the qubit, or equivalently, the amount of flux in the loops of the qubits. The quantity $J_{ij}$ is the strength of the coupling between a $i^{th}$ and a $j^{th}$ qubit. The coupling energy is a function of the mutual inductance between qubits $J_{ij}=M_{ij} I_i I_j$. In order to encode the three node frustrated ring problem, the three coupling energies are arranged such that $J_{12} \gg J_{13} \approx J_{23}$.

In some embodiments of the present methods, the coupling strength between any two abutting qubits is a product of the mutual inductance and the currents in the coupled qubits. The mutual inductance is a function of common surface area and distance. The greater the common surface area had between two adjacent qubits the stronger the mutual inductance. The greater the distance had between two adjacent qubits the less the mutual inductance. The current in each qubit is a function of the Josephson energy of the qubit, $E_J$. $E_J$ depends on the type of Josephson junctions interrupting the superconducting loop within the qubit. Inductance calculations can be performed using programs such as FASTHENRY, a numeric three-dimensional inductance calculation program, is freely distributed by the Research Laboratory of Electronics of the Massachusetts Institute of Technology, Cambridge, Mass. See, Kamon, et al., 1994, "FASTHENRY: A Multipole-Accelerated 3-D Inductance Extraction Program," *IEEE Trans. on Microwave Theory and Techniques*, 42, pp. 1750-1758.

Act 403 (Initialization of System 500 to $H_o$).

Qubits 101 of system 500 of FIG. 5A interact with their environment through a magnetic field that is applied perpendicular to the plane of FIG. 5A by causing a current to flow through coil 502 of the tank circuit. At 403, system 500 is set to an initial state characterized by the Hamiltonian $H_o$ by applying such an external magnetic field. This externally applied magnetic field creates an interaction defined by the Hamiltonian:

$$H_0 = Q \sum_{i=1}^{N} \sigma_i^Z$$

where Q represents the strength of an external magnetic field. In some embodiments, the external magnetic field has a strength such that $\varepsilon \gg \Delta$ or $\varepsilon \gg J$. That is, the magnetic field is on an energy scale that is large relative to other terms in the Hamiltonian. As an example, for a qubit having the dimensions of 50 to 100 micrometers squared, the magnetic field is between about $10^{-8}$ teslas and about $10^{-6}$ teslas. The energy of a magnetic field B in a persistent current qubit of area S, in terms of MKS units is $\frac{1}{2}\mu_o S \cdot B^2$ where $\mu_0$ is $4\pi \times 10^{-7}$ Wb/(A·m) (webers per ampere meter). The magnetic field also controls the bias $\varepsilon$ applied to each qubit. System 500 is in the ground state $|000\rangle$ of $H_0$ when the flux that is trapped where the flux produced by each qubit 101 is aligned with the external magnetic field.

Once system 500 is in the ground state $|000\rangle$ of the starting state $H_0$, it can be used to solve the computational problem hard-coded into the system through the engineered inter-qubit coupling constants. To accomplish this, the applied magnetic field is removed at a rate that is sufficiently slow to cause the system to change adiabatically. At any given instant during the removal of the externally applied initialization magnetic field, the state of system 500 is described by the Hamiltonian:

$$H = \sum_{i=1}^{N} [\varepsilon_i \sigma_i^Z + \Delta_i \sigma_i^X] + \sum_{i=1}^{N} \sum_{j>i}^{N} J_{ij} \sigma_i^Z \otimes \sigma_j^Z.$$

where $\Delta$ is a tunneling term that is a function of the bias $\varepsilon$ applied by coil 502. As described above, the bias $\varepsilon$ may be applied by coil 502 be such that a half flux quantum ($0.5\Phi_0$) be trapped in each qubit 101 so that the two stable states of each qubit have the same energy (are degenerate) to achieve optimal quantum tunneling. Furthermore, each qubit may have the same total surface area so that quantum tunneling in each qubit starts and stops at the same time. Alternatively, qubits 101 are biased by coil 502 such that the flux trapped in each qubit is an odd multiple of $0.5\Phi_0$ (e.g., $N \cdot 0.5\Phi_0$, where N is 1, 2, 3 . . . ) since the bistable states of the qubits 101 will have equal energy and degenerate. However, such higher amounts of trapped flux can have undesirable side effects on the properties of the superconducting current in the qubits. For instance, large amounts of trapped flux in qubits 101 may quench the superconducting current altogether that flows through the superconducting loop of each loop. In some embodiments, the qubits are biased by coil 502 such that the amount of flux trapped in each qubit is $\zeta \cdot N \cdot 0.5\Phi_0$ where $\zeta$ is between about 0.7 and about 1.3, and where N is a positive integer. However, qubits 101 tunnel best when the bias in each corresponds to half-flux quantum of flux.

Act 405 (Reaching the Problem State $H_P$).

As the external perpendicularly applied field is adiabatically turned off, a problem Hamiltonian $H_P$ is arrived at:

$$H_P = \sum_{i=1}^{N} \sum_{j>i}^{N} J_{ij} \sigma_i^Z \otimes \sigma_j^Z.$$

Note that, unlike the instantaneous Hamiltonian, the problem Hamiltonian does not include the tunneling term $\Delta$. Thus, when system 500 reaches the final problem state and the quantum states of each respective qubit 101 can no longer tunnel. Typically, the final state is one in which no external magnetic field is applied to qubits 101 and, consequently, qubits no longer trap flux.

Act 407 (Measurement).

At 407, the quantum system is measured. In the problem addressed in the present system, there eight possible solutions {000, 001, 010, 100, 011, 110, 101, and 111}. Measurement involves determining which of the eight solutions was adopted by system 500. An advantage of the present methods is that this solution will represent the actual solution of the quantum system.

Figure 5B:
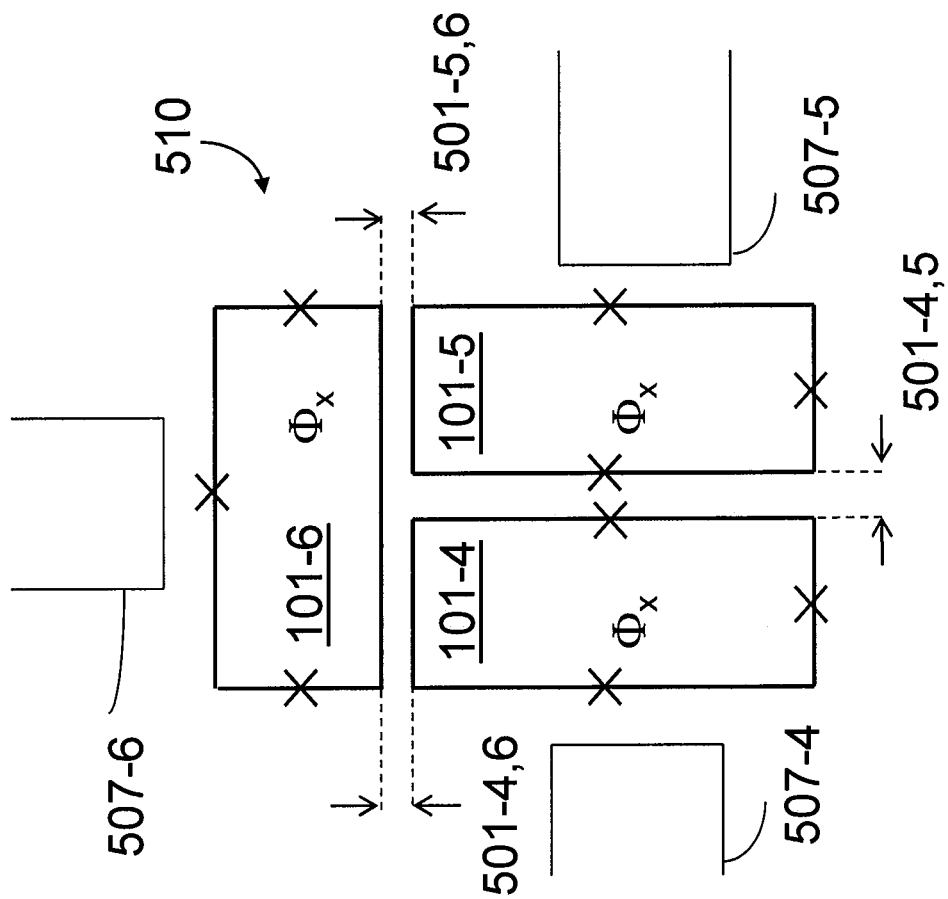
Figure 5C:
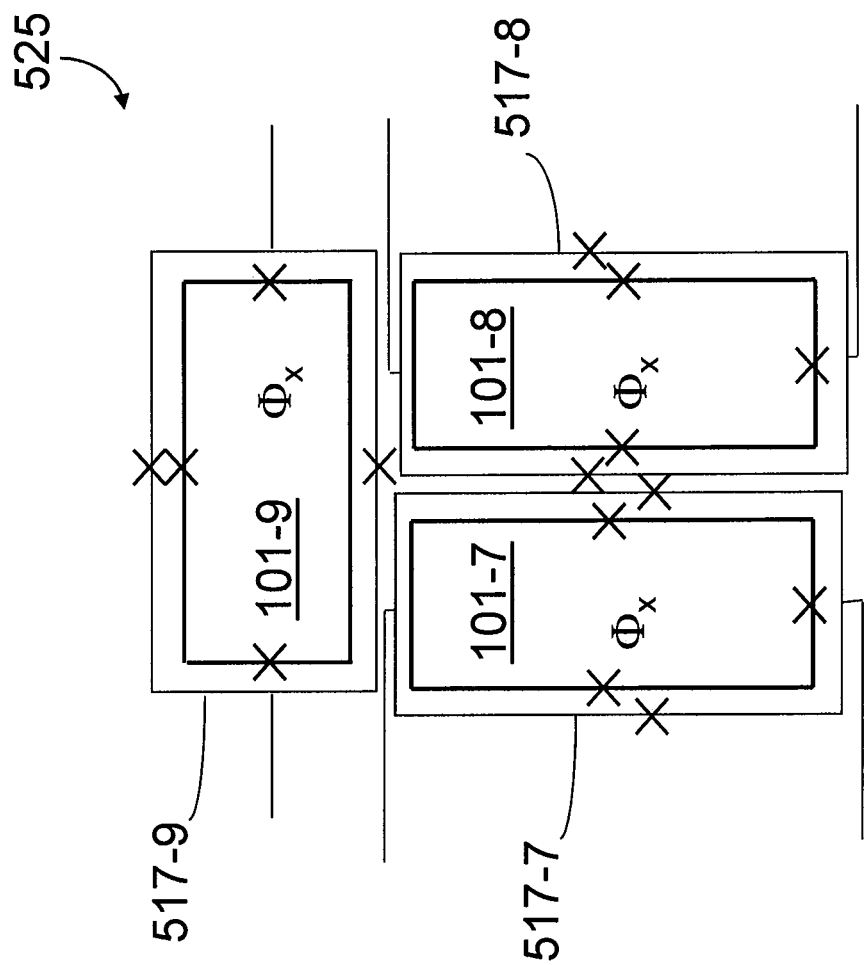
Figure 5E:
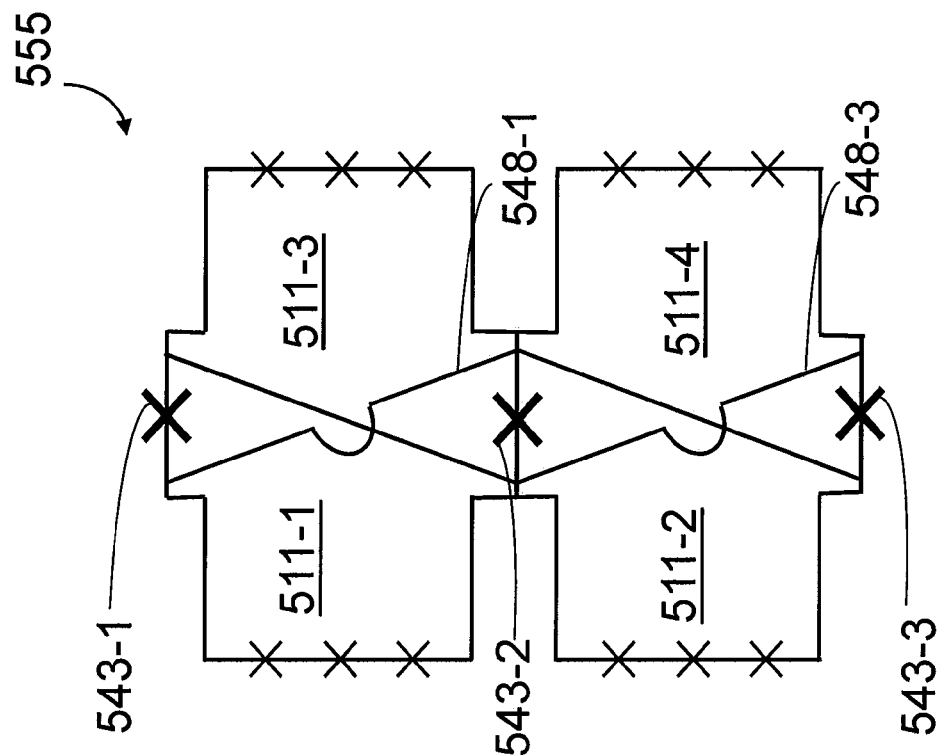

In an embodiment of the present methods, the result of the adiabatic quantum computation is determined using individual qubit magnetometers. Referring to FIG. 5C, a device 517 for detecting the state of a persistent current qubit is placed proximate to each qubit 101. The state of each qubit 101 can then be read out to determine the ground state of $H_P$. In an embodiment of the present methods, the device 517 for detecting the state of the qubit is a DC-SQUID magnetometer, a magnetic force microscope, or a tank circuit dedicated to a single qubit 101. The read out of each qubit 101 creates an image of the ground state of $H_P$. In embodiments of the present methods the device for reading out the state of the qubit encloses the qubit. For example a DC-SQUID magnetometer like 517-7, 517-8, and 517-9 in FIG. 5C, may enclose a persistent current qubit, e.g. 101-7, 101-8, and 101-9, to increase the readout fidelity of the magnetometer.

Figure 5D:
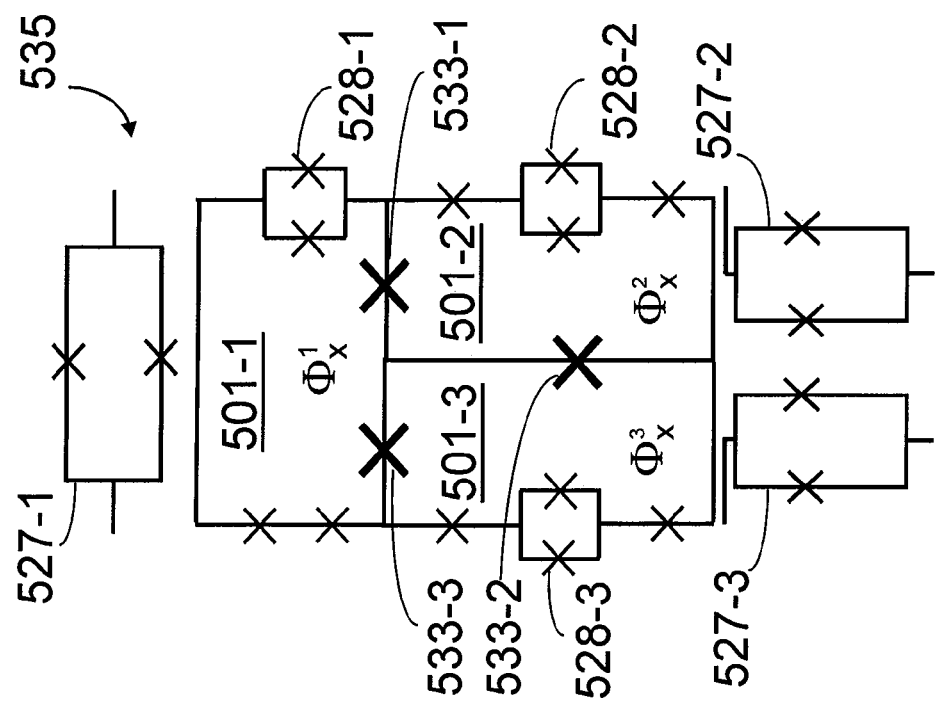

In an embodiment of the present methods, the result of the adiabatic quantum computation is determined using individual qubit magnetometers laid adjacent to respective qubits in the quantum system. Referring to FIG. 5D, devices 527-1, 527-2, and 527-3 are for detecting the state of a persistent current qubit and are respectively placed beside corresponding qubits 501-1, 501-2, and 501-3. The state of each qubit 501 can then be read out to determine the ground state of $H_P$. In an embodiment of the present methods, the device for detecting the state of a qubit 501 is a DC-SQUID magnetometer, dedicated to one qubit.

In an embodiment of the present methods, the qubits 501 used in the adiabatic quantum computation are coupled by Josephson junctions. Referring to FIG. 5D, qubits 501-1, 501-2, and 501-3 are coupled to each other by Josephson junctions 533. In particular, Josephson junction 533-1 couples qubit 501-1 to qubit 501-2, Josephson junction 533-2 couples qubit 501-2 to qubit 501-3, and Josephson junction 533-3 couples qubit 501-3 to qubit 501-1. The sign of the coupling is positive for anti-ferromagnetic coupling, the same as inductive coupling. The energy (strength) of the coupling between persistent current qubits 501 that are coupled by Josephson junctions can be about 1 Kelvin. In contrast, the energy of the coupling between persistent current qubits 501 that are inductively coupled is about 10 milliKelvin. In an embodiment of the present methods, the term "about" in relation to coupling energies, such as Josephson junction mediated and inducted coupling between persistent current qubits, is defined as a maximum variance of up to ±500% of the energy stated. The coupling energy between two qubits is proportional $2I^2/E$ where I is the current circulating the qubits, and E is the Josephson energy of the coupling Josephson junction. See, Grajcar et al., 2005, arXiv.org: cond-mat/0501085.

In an embodiment of the present methods, qubits 501 used in the adiabatic quantum computation have tunable tunneling energies. Referring to FIG. 5D, in such an embodiments, qubits 501-1, 501-2, and 501-3 include split or compound Josephson junctions 528. Other qubits, described herein can make use of a split junction. Compound Josephson junction 528-1 is included in qubit 501-1 in the embodiments illustrated in FIG. 5D. Further, the compound Josephson junction 528-2 is included in qubit 501-2, the compound Josephson junction 528-3 is included in qubit 501-3. Each compound junction 528 illustrated in FIG. 5D includes two Josephson junctions and a superconducting loop in a DC-SQUID geometry. The energy of the Josephson junction $E_J$, of the qubit 501, which is correlated with the tunneling energy of the qubit, is controlled by an external magnetic field supplied by the loop in the corresponding compound Josephson junction 528. The Josephson energy of compound 528 can be tuned from about twice the Josephson energy of the constituent Josephson junctions to about zero. In mathematical terms, $$E_J = 2E_J^0 \left| \cos\left(\frac{\pi \Phi_X}{\Phi_0}\right) \right|$$

where $\Phi_X$ is the external flux applied to the compound Josephson junction, and $E_J^0$ is the Josephson energy of one of the Josephson junctions in the compound junction. When the magnetic flux through split junction 528 is one half a flux quantum the tunneling energy for the corresponding qubit 501 is zero. The magnetic flux in the compound Josephson junctions 528 may be applied by a global magnetic field.

In an embodiment of the present methods the tunneling of qubits 501 is suppressed by applying a flux of one half a flux quantum to the compound Josephson junction 528 of one or more qubits 501. In an embodiment of the present methods the split junction loop is orientated perpendicular to the plane of the corresponding (adjacent) qubit 501 such that flux applied to it is transverse in the field of the qubits.

Referring to FIG. 5, in an embodiment of the present methods, the qubits used in the adiabatic quantum computation have both ferromagnetic and antiferromagnetic couplings. The plurality of qubits 555 in FIG. 5E are coupled both by ferromagnetic and antiferromagnetic couplings. Specifically, the coupling between qubits 511-1 and 511-3, as well as between qubits 511-2 and 511-4, are ferromagnetic while all other couplings are antiferromagnetic (e.g., between qubits 511-1 and 511-2). The ferromagnetic coupling is induced by crossovers 548-1 and 548-2.

Referring to FIG. 5A, in some embodiments of the present methods, the state of each qubit 101 of system 500 is not individually read out. Rather, such embodiments make use of the profile of the energy level diagram of system 500, as a whole, over a range of probing biasing currents. In such embodiments, when system 500 reaches $H_P$ the system is probed with a range of biasing currents using, for example, a tank circuit that includes coil 502. The overall energy level of system 500 over the range of biasing currents applied during the measurement 407 define an energy level profile for the system 500 that is characteristic of the state of system 500. Furthermore, as discussed in more detail below, system 500 is designed in some embodiments such that each of the possible eight states that the system could adopt has a unique calculated energy profile (e.g., unique number of inflection points, unique curvature). In such embodiments, measurement of $H_P$ can be accomplished by computing the energy profile of system 500 with respect to a range of biasing currents. In such embodiments, the state of system 500 (e.g., 001, 010, 100, etc.) is determined by correlating the calculated characteristics (e.g., slope, number of inflection point, etc.) of the measured energy profile to the characteristics of the energy profile calculated for each of the possible solutions (e.g., the characteristics of a calculated energy profile for 001, the characteristics of a calculated energy profile for 010, etc.). When designed in accordance with the present methods, there will only be one calculated energy profile that matches the measured energy profile, and this will be the solution to the problem of finding the ground state or final state of a frustrated ring.

In other embodiments of the present methods, the state of each qubit 101 of system 500 is not individually read out. Rather, such embodiments make use of the profile of the energy level diagram of system 500 as a whole over a range of probing biasing currents. In such embodiments, when system 500 reaches $H_P$ the system is probed with a range of biasing currents using, for example, a tank circuit that includes coil 502 (FIG. 5A). The overall energy level of system 500 over the range of biasing currents applied during the measurement 407 define an energy level profile for the system 500 that is characteristic of the state that the system is in. Furthermore, as discussed in more detail below, system 500 can be designed such that each of the possible eight states that the system could have is characterized by a unique calculated energy profile (e.g., unique number of inflection points, unique curvature). In such embodiments, measurement of $H_P$ could involve computing the energy profile of system 500 with respect to a range of biasing currents and then determining the state of system 500 (e.g., 001, 010, 100, etc.) by correlating the calculated characteristics (e.g., slope, number of inflection point, etc.) of the measured energy profile to the characteristics of the energy profile calculated for each of the possible solutions (e.g., the characteristics of a calculated energy profile for 001, the characteristics of a calculated energy profile for 010, and so forth). When designed in accordance with this embodiment of the present methods, there will only be one calculated energy profile that matches the measured energy profile and this will be the solution to the problem of finding the ground state of the modeled frustrated ring.

Figure 7A:
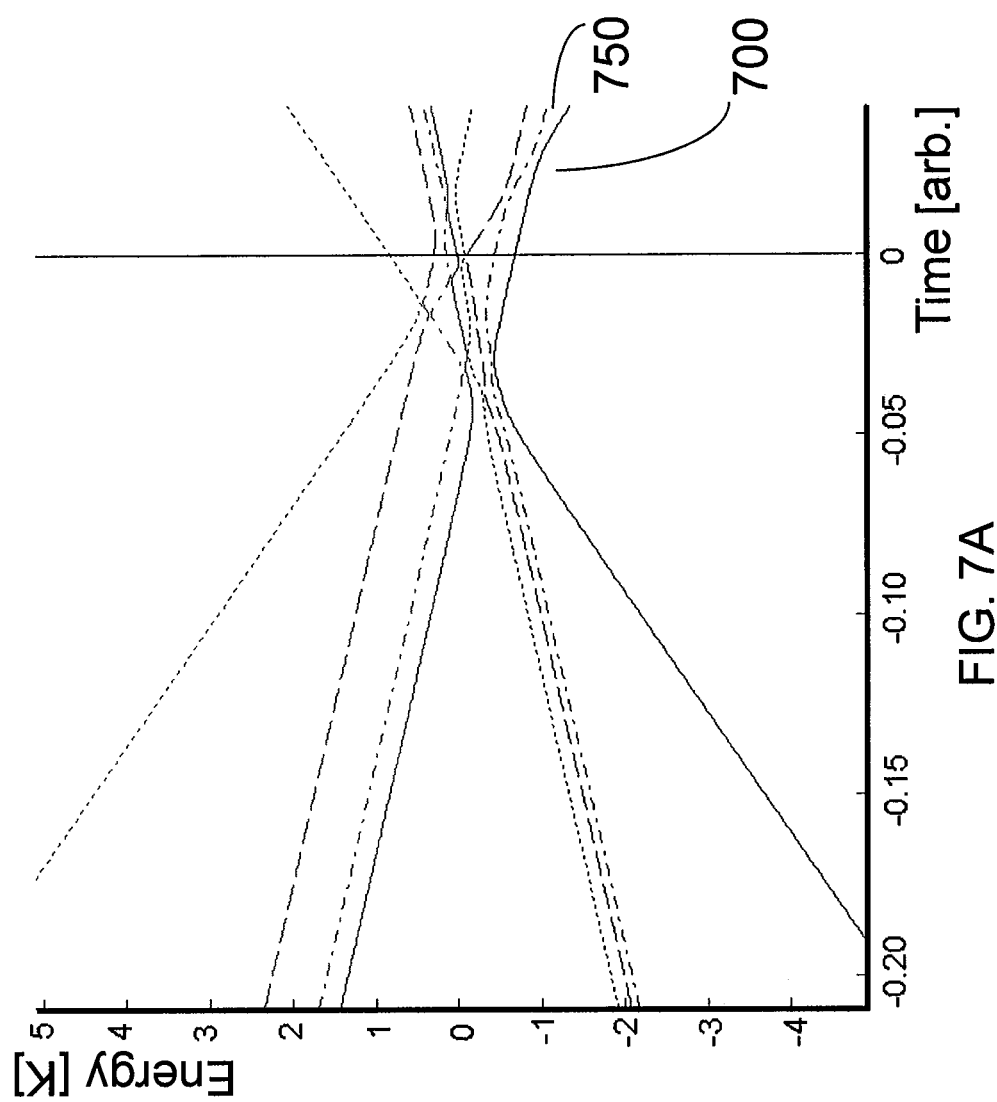
FIG. 7A illustrates an energy level diagram for a system comprising a plurality of superconducting qubits during an instantaneous adiabatic change of the system.
Figure 7B:
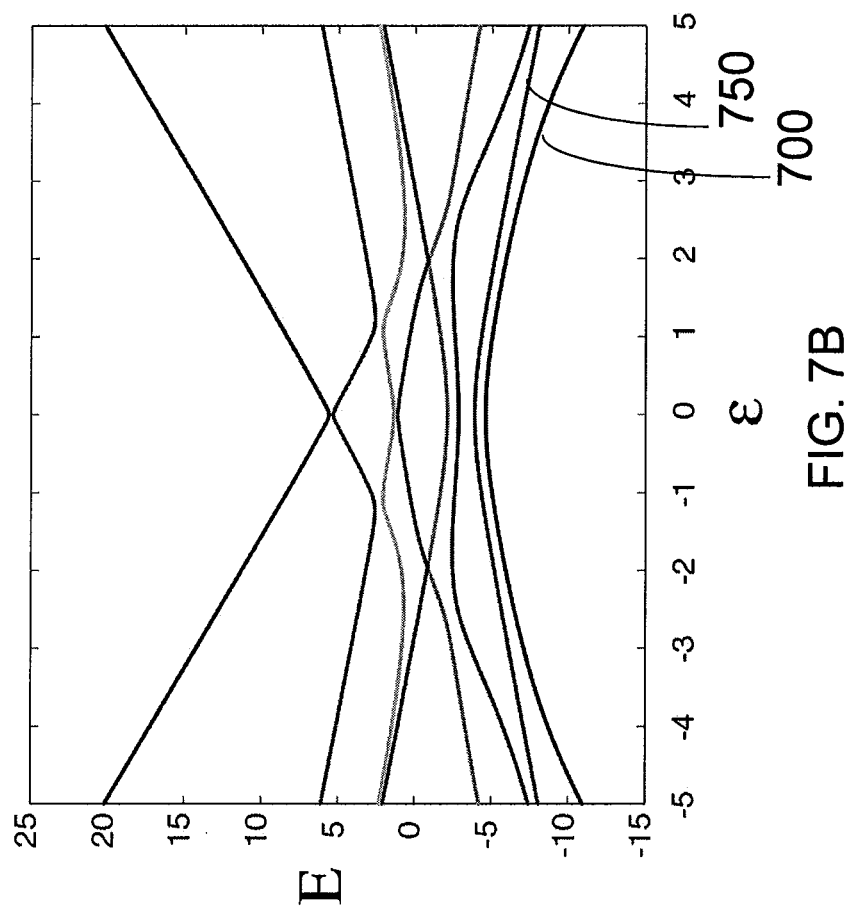
FIG. 7B illustrates an energy level diagram for a system comprising a plurality of superconducting qubits when the plurality of qubits are described by the ground state of a problem Hamiltonian $H_P$.

For many embodiments of the present methods, the energy levels of the system for adiabatic quantum computing $H_P$ across a range of probing biasing values are differentiable from each other. FIG. 7B illustrates an example of this. Consider a system 500 in which two of the three inter-qubit coupling constants are equal to $\delta$ ($J_{13}=J_{23}=\delta$) and the third is equal to three times that amount $J_{12}=3\cdot\delta$. Further, the tunneling rates of the qubits are about equal and, in fact are about equal to the small coupling value $\delta$ (e.g., $\Delta_1=1.1\cdot\delta$; $\Delta_2=\delta$; $\Delta_3=0.9\cdot\delta$) where $\cdot\delta$ is in normalized units. In an embodiment of the present methods, $\delta$ can be a value in the range of about 100 megahertz to about 20 gigahertz. When system 500 is configured with these tunneling and coupling values then the curvature of the two lowest energy levels will be different from each other and therefore can be distinguished by the impedance techniques described previously. In these impedance techniques, the final bias current applied by the tank circuit in system 500 is not fixed. Rather, it is adjusted to produce the energy levels of FIG. 7B. Indeed, FIG. 7B is plotted as a function of energy E versus bias $\epsilon$, for an example where the areas encompassed by each of the qubits 101 are equal (e.g., system 500 of FIG. 5A). The bias $\epsilon$ is in units of energy and the scale of the horizontal axis of FIG. 7B has is in units equal to $\Delta$. The bias is the same for each qubit, because the area is same for each qubit. By contrast, FIG. 7A shows the energy levels for various instantaneous times during the adiabatic change from a state $H_0$ to a state $H_P$.

Considering FIG. 7B, embodiments of the present methods use existing techniques for differentiating energy levels by shape, where the shape or curvature of a first energy level as a function of bias $\epsilon$ can be differentiated from other energy levels. See, for example, United States Patent Publication 2003/0224944 A1, entitled "Characterization and measurement of superconducting structures," which is hereby incorporated by reference in its entirety. The impedance readout technique can be used to readout the system 500 to determine the states of the qubits in the frustrated arrangement. The unique curvature for each possible energy level (solution) does not significantly change if $J_{13}$ is about equal to $J_{23}$.

In an embodiment of the present methods, the system is read out by differentiating various energy levels (solutions) to identify the ground state. In an example of the persistent current qubit, the dephasing rate is currently recorded as being 2.5 microseconds or less. Once the system is in a state of $H_P$ the state, e.g. 700 or 750 of FIGS. 7A and 7B can be determined by locally probing the energy level structure by low frequency applications of a biasing magnetic field.

The states of energy level diagram like that of FIG. 7B can be differentiated through the curvatures, and number of inflection points of the respective energy levels. Two energy levels may have a different sign on the curvature that allows them to be distinguished. Two energy levels may have the same signs but have different magnitudes of curvature. Two energy levels may have a different number of inflection points. All of these generate different response voltages in the tank circuit. For instance, an energy level with two inflection points will have a voltage response for each inflection. The sign of the voltage response is correlated with the sign of the curvature.

Knowledge of the initial energy level and the corresponding voltage response can allow the ground state to be determined provided that a sampling of some of the lowest energy levels voltage response has been made. Accordingly, in an embodiment of the present methods, the system is not initialized in the ground state of the initial Hamiltonian. Rather the system is initialized in an excited state of the system such as 750. Then the interpolation between initial and final Hamiltonians occurs at a rate that is adiabatic but is faster than the relaxation rate out of state 750. In one example of a persistent current qubit, the relaxation rate is about 1 to about 10 microseconds. The ground state will have a greater curvature and the lowest number inflection points of the energy levels of the system.

Observation and Readout by Traversing Crossings and Anticrossings

This section describes techniques for reading out the state of a quantum system 850. In some embodiments, this is accomplished by reading out the state of each qubit within quantum system 850 on an individual basis. Individualized readout of qubits in a quantum system 850 can be accomplished, for example, by making use of individual bias wires or individual excitation devices 820 for each qubit within quantum system 850 as described in this section and as illustrated in FIG. 5B. In some embodiments, the entire process described in FIG. 4 is repeated, and during each repetition a different qubit in the quantum system 850 is measured. In some embodiments it is not necessary to repeat the process described in FIG. 4 for each qubit in quantum system 850.

Figure 8:
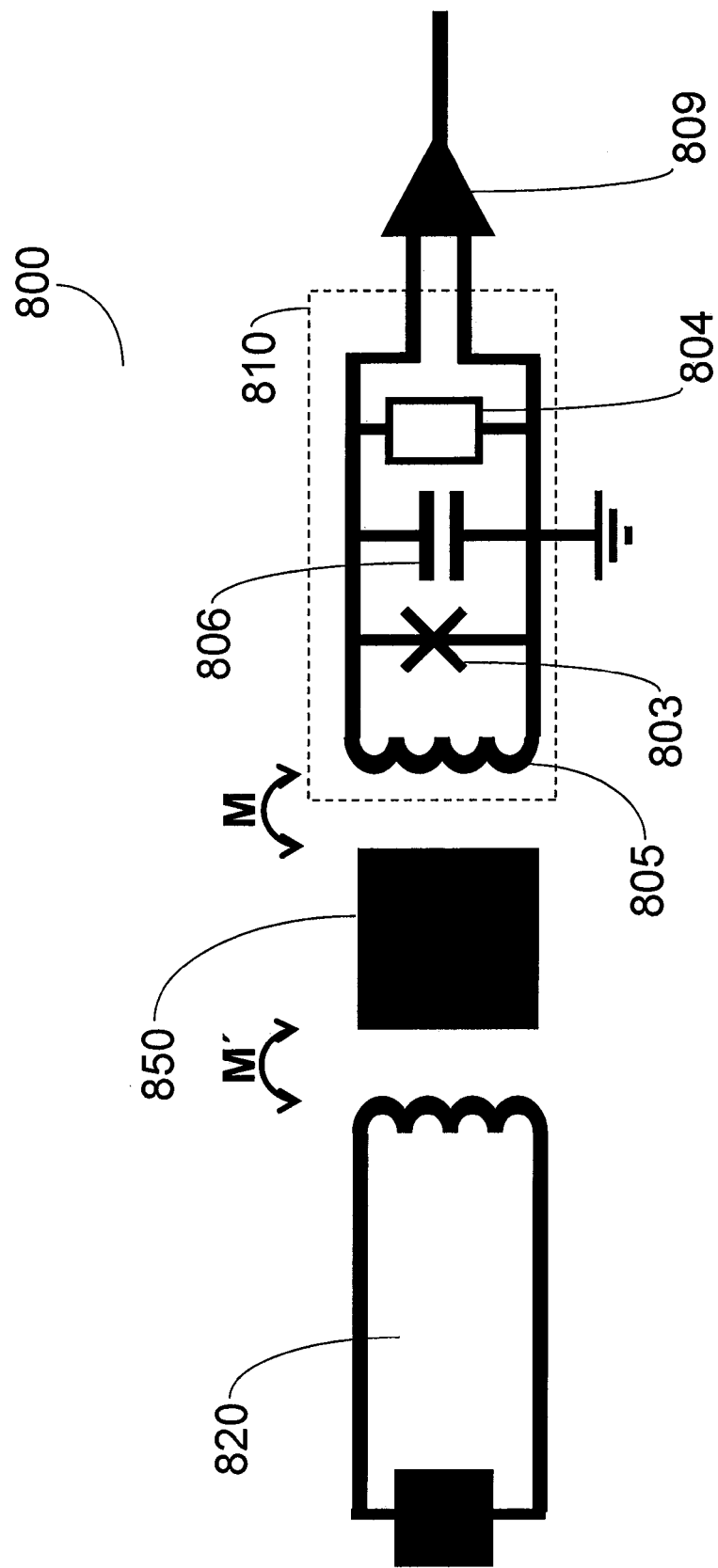
FIG. 8 illustrates a device for controlling and reading out the state of a superconducting qubit for adiabatic quantum computing in accordance with some embodiments of the present methods.
Figure 9B:
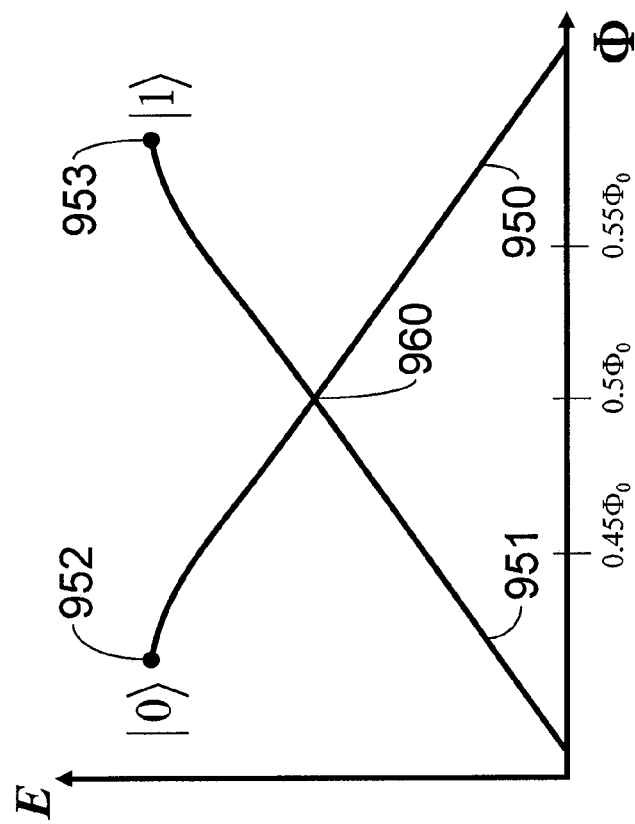
FIG. 9B illustrates an energy level diagram for a physical system having an energy level crossing in accordance with an embodiment of the present methods.
Figure 9A:
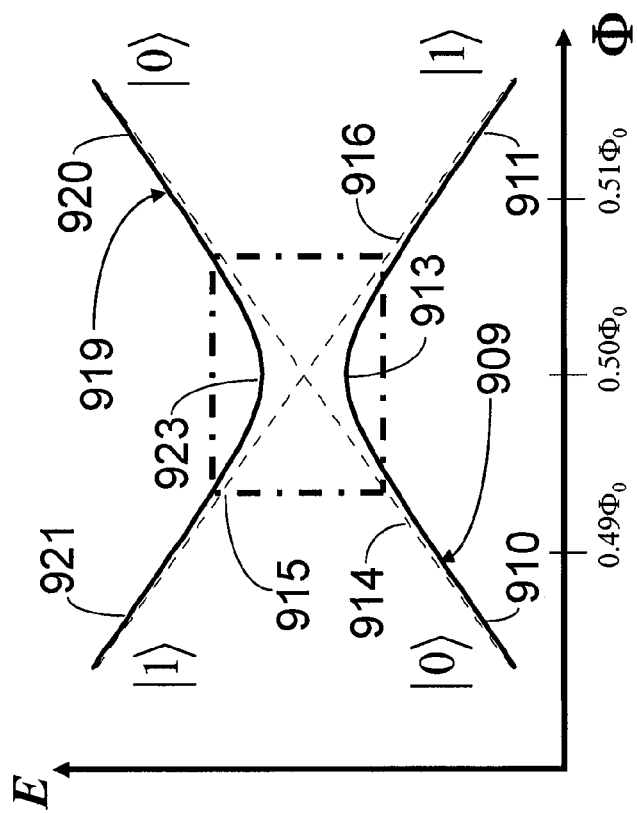
FIG. 9A illustrates an energy level diagram for a physical system in which the energy level diagram exhibits an anticrossing between energy levels of the physical system in accordance with an embodiment of the present methods.

FIG. 9 illustrates sections of energy level diagrams with energy level crossing and anticrossing. FIGS. 9A and 9B are useful for describing how the readout of superconducting qubits in quantum system 850 works, and how one performs such a readout. FIGS. 9A and 9B show energy levels for a qubit as a function of external flux $\Phi$ applied on the qubit. In some embodiments, aspects of system 800 from FIG. 8 can be represented by FIGS. 9A and 9B. For example, superconducting qubit 850 of FIG. 8 can have an energy level crossing or anticrossing depicted in FIG. 9 that can be probed by tank circuit 810 in some embodiments.

Figure 1B:
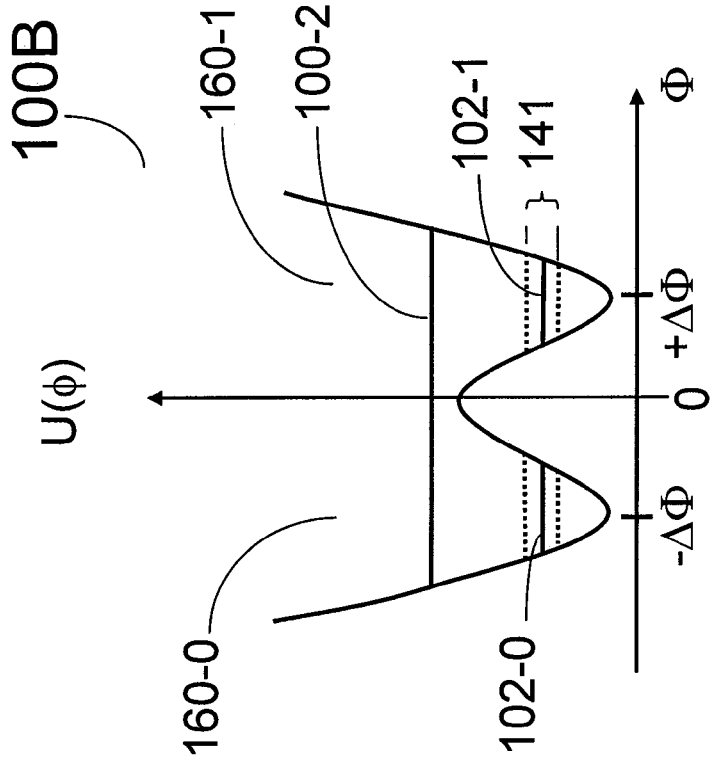
FIG. 1B illustrates a known energy potential for a superconducting qubit.
Figure 1A:
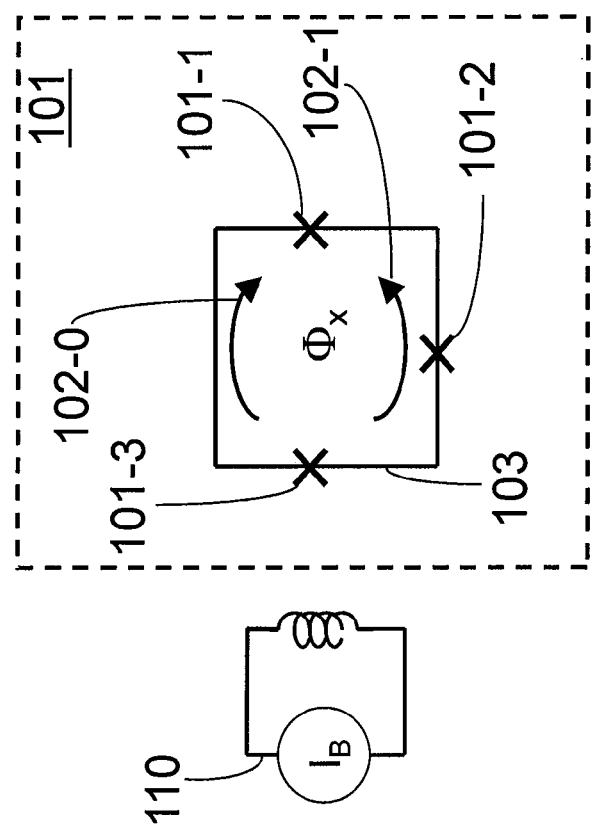
FIG. 1A illustrates a known superconducting qubit.
Figure 2:
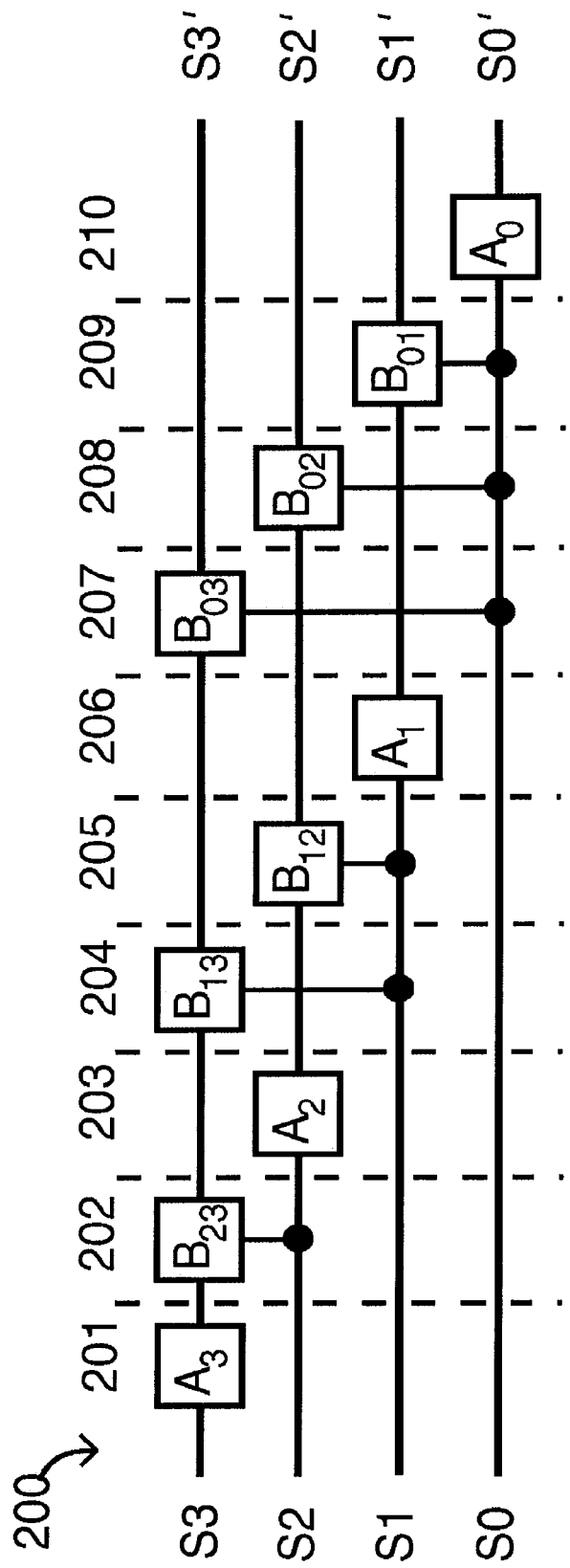
FIG. 2 illustrates an exemplary quantum computation circuit model in accordance with the prior art.

FIG. 9A illustrates an energy level diagram with an anticrossing. An anticrossing arises between energy levels of a qubit when there is a tunneling term or, more generally, a transition term between the levels. Energy levels 909 (ground state) and 919 (excited state) have a hyperbolic shape as a function of applied magnetic flux, with an anticrossing within box 915, and approach asymptotes 914 and 916. The value of $\Delta_m$ for the energy level diagram is the difference in the slopes of the pair of asymptotes 914 and 916 near the anticrossing. Lines 914 and 915 of FIG. 9A are an example of a set of asymptotes near an anticrossing. The superconducting qubit, part of a quantum system 850, and described by the energy diagram of FIG. 9A, has computational basis states |0⟩ and |1⟩. In an embodiment of the present methods where the superconducting qubit is a three-Josephson junction qubit, the |0⟩ and |1⟩ computational basis states correspond to right and left circulating supercurrents (102-0 and 102-1 of FIG. 1A). The |0⟩ and |1⟩ computational basis states are illustrated in FIG. 9A. In the ground state 909 of the qubit represented by FIG. 9A, the |0⟩ basis state corresponds to region 910 to the left of degeneracy point 913 and the |1⟩ basis state corresponds to region 911 on the right of the degeneracy point. In the excited state 919 of the qubit represented by FIG. 9A, the |0⟩ basis state is on the right of degeneracy point 923 in region 920 while the |1⟩ basis state corresponds to region 921 on the left of degeneracy point 923.

In accordance with an embodiment of the present methods, a method for reading out the state of a superconducting qubit within quantum system 850 involves using tank circuit 810 to apply a range of fluxes to the superconducting qubit over a period of time and detecting a change in the properties of the tank circuit coupled to the superconducting circuit during the sweep. In the case where the qubit is a superconducting flux qubit, a superconducting loop with low inductance L interrupted by three Josephson junctions, the flux applied during the sweep can range from about $0.3\Phi_0$ to $0.7 \cdot \Phi_0$. In some embodiments of the present methods, the flux sweep is performed adiabatically to ensure that the qubit remains in its ground state during the transition. Under this adiabatic sweep, tank circuit 810 (FIG. 8) detects when the quantum state of the qubit crosses the anticrossing and hence determines the quantum state of the qubit at the end of 405 of FIG. 4. For example, referring to FIG. 9A, if the qubit is in ground state |0⟩ at the end of 405 on the left of the energy level anticrossing 915 and the flux is adiabatically increased during 407, then the tank circuit will detect anticrossing 915. On the other hand, if the qubit is in ground state |1⟩ at the end of 405 on the right of anticrossing 915, then when the flux is increased the qubit will not cross anticrossing 915 and therefore no such anticrossing will be detected. In this way, provided that the qubit is maintained in the ground state, the applied sweep of fluxes can be used to determine whether the qubit was in the |0⟩ or the |1⟩ basis state prior to readout.

FIG. 9B illustrates an energy level diagram for a qubit in a quantum system 850 having an energy level crossing. An energy level crossing arises between energy levels of the qubit when there is no tunneling term, a minimal tunneling term, or, more generally, no transition term between energy levels of the qubit being read out. This is in contrast to FIG. 9A, where there is an anticrossing between energy levels of a qubit due to a tunneling term or, more generally, a transition term between such energy levels. Energy levels 950 and 951 of FIG. 9B lie in part where asymptotes 914 and 916 of FIG. 9A cross. The computational basis states of the qubit represented by the energy level diagram FIG. 9B are labeled. The |0⟩ state corresponds to the entire energy level 950 between crossing 960 and terminus 952. The |1⟩ state corresponds to the entire energy level 951 between crossing 960 and terminus 953.

At termini 952 and 953, the states corresponding to energy levels disappear and the state of the qubit falls to the first available energy level. As illustrated in FIG. 9B, in the case of the |0⟩ state, beginning at crossing 960, as the flux Φ in the qubit is decreased and the energy of the |0⟩ state rises, the qubit remains in the |0⟩ state until terminus 952 is reached at which point the |0⟩ state vanishes. In contrast, if the qubit was in the |1⟩ state, then beginning at crossing 960, as the flux Φ in the qubit is decreased, the energy of the |1⟩ state gradually decreases. Thus, the behavior of a qubit that has no coupling term exhibits hysteretic behavior meaning that the state of the qubit at crossing 960 depends on what the state the qubit was in prior to the flux being brought to the value correlated with crossing 960.

The readout 407 (FIG. 4), in accordance with some embodiments of the present methods of a superconducting qubit having either no coupling term or a coupling term that is small enough to be disregarded, involves sweeping the flux applied to the superconducting qubit by an amount and in a direction designed to detect crossing 960 and termini 952 and 953. This method makes use of the fact that a tank circuit can detect the crossing by the hysteretic behavior of the qubit. The measurable quantities are two voltage dips of tank circuit 810 having asymmetrical shape with respect to bias flux. In other words, the tank circuit 810 will experience a voltage dip to the left and to the right of crossing 960, regardless of which energy state the superconducting qubit is in. Each of the voltage dips is correlated with a state of quantum system 850.

Referring to FIG. 9B, if the superconducting qubit is in the |0⟩ state, e.g. at energy level 950, and the flux applied to the superconducting qubit is increased, then the state of the qubit will remain as |0⟩ and no voltage dip is observed. Likewise, if the superconducting qubit is in the |1⟩ state, e.g. on energy level 951, and the flux applied to the superconducting qubit is decreased, then the state of the qubit will remain as |1⟩ and no voltage dip is observed.

Now consider the case in which the superconducting qubit is in the |0⟩ state, e.g. at energy level 950, and the flux applied to the superconducting qubit is decreased. In this case, the qubit will remain in the |0⟩ state until the flux is decreased to just before the point corresponding to terminus 952, at which point a wide dip will occur in the voltage of tank circuit 810 due to slight curvature of level 950 in the vicinity of terminus 952. After the flux is decreased past terminus 952, the state transitions from |0⟩ to |1⟩ because state |0⟩ no longer exists. Consequently, there is an abrupt rise in voltage across tank circuit 810.

Further consider the case in which a qubit within quantum system 850 of FIG. 8 is in the |1⟩ state, e.g. at energy level 951 of FIG. 9B, and the flux applied to the superconducting qubit is increased. In this case, the state of the qubit will remain in the |1⟩ basis state until the flux is increased to just before terminus 953, where a wide dip will occur in the voltage of tank circuit 810 due to slight curvature in energy level 951 in the vicinity of terminus 953. After the flux is increased past terminus 953, the state transitions to the |0⟩ state and there is an abrupt rise in the voltage of tank circuit 810.

Form of Readout Signals

Figure 10A:
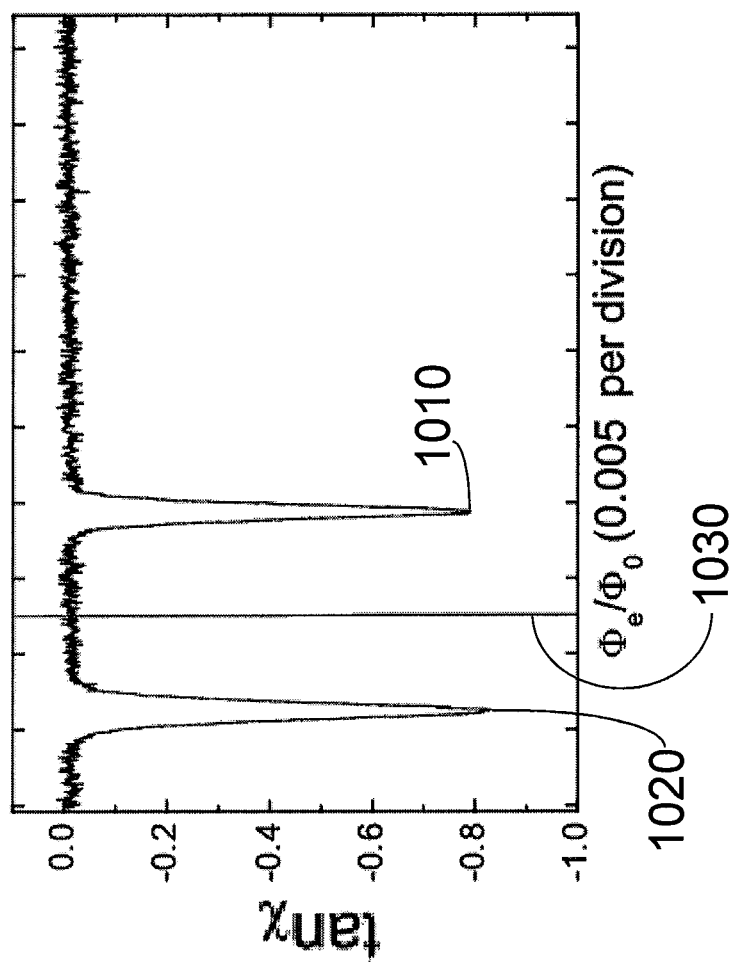
FIG. 10A illustrates the form of a readout signal for a superconducting qubit having an anticrossing between two energy levels.
Figure 10B:
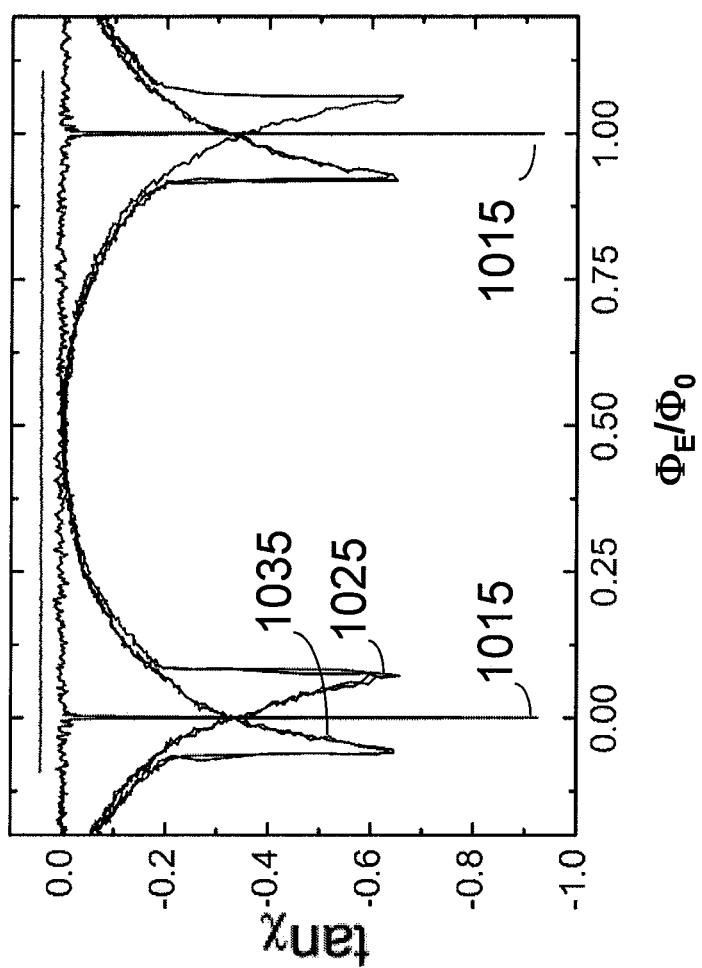
FIG. 10B illustrates the form of a readout signal for a superconducting qubit having that does not have anticrossing between two energy levels.

In accordance with some embodiments of the present methods, FIG. 10 depicts examples of the form of readout signals, e.g. tank circuit 810 voltage dips, obtained by measurement of a superconducting qubit or plurality of superconducting qubits in a quantum system 850. FIG. 10A illustrates the form of a readout signal for a superconducting qubit that includes an anticrossing (FIG. 9A) between two energy levels. FIG. 10B illustrates the form of a readout signal for a superconducting qubit that includes a crossing (FIG. 9B) between two energy levels. FIGS. 10A and 10B plot the voltage response of a tank circuit against the additional flux $\Phi_A$ in the qubit.

Voltage dips 1010 and 1020 in FIG. 10A are correlated with an anticrossing located to the right and left of equilibrium 1030. In accordance with the conventions of FIG. 9A, voltage dips 1010 and 1020 corresponds to the measured qubit being in the |0⟩ and |1⟩ state, respectively. Using the conventions of FIG. 9A, the graph illustrated in FIG. 10A depicts two measurement results. If the dip 1010 is observed this is an indication that the qubit was in the |0⟩ state. If the dip 1020 is observed this is an indication that the qubit was in the |1⟩ state. Both dips are drawn for illustrative purposes, but ordinarily only one would be observed. A person having ordinary skill in the art will appreciate that assignment of the labels "0" and "1" to states |0⟩ and |1⟩ is arbitrary and that direction of circulation of the current in the superconducting qubit is the actual physical quantity being measured. Further a person having ordinary skill in the art can make such a labeling for the physical state of any described embodiment of the present methods.

FIG. 10B is also the output from an oscilloscope. Graph 10B spans a wider range of additional fluxes $\Phi_A$ than graph 10A. The periodic behavior of the measured qubit is shown by the repetition of features every flux quantum along the horizontal axis. A voltage dip in this view is denoted by 1015 and corresponds to an unspecified state that is an equilibrium point. Also found in FIG. 10B are voltage dips that represent an energy level crossing for the measured qubit. The plot shows dips 1025 and 1035, with the tell tale signs of hysteretic behavior—a voltage dip that is wide on one side and has a sharp rise on the other. As the flux is applied to the qubit, the characteristics of the sides reverse location. Hysteric behavior is a term used to describe a system whose response depends not only on its present state, but also upon its past history. Hysteric behavior is shown by the dips in the voltage of tank circuit 810 illustrated in FIG. 10B. The behavior at particular points in the sweep illustrated in FIG. 10B depends on whether the flux is being increased or decreased. A person having ordinary skill in the art will appreciate that this behavior evidences hysteretic behavior and therefore the presence of an energy level crossing (e.g., crossing 960 of FIG. 9B). See, for example, United States Patent Publication, US 2003/0224944 A1, entitled "Characterization and measurement of superconducting structures," which is hereby incorporated by reference in its entirety. Referring to FIG. 10B, the state the qubit was in prior to readout is determined by the location of voltage dips 1025 and 1035 relative to an equilibrium point. As per the conventions of FIG. 9B, if voltage dips 1025 and 1035 are to the left of the equilibrium point, than the qubit is in the |1⟩ basis state prior to readout, whereas the qubit is in the |0⟩ basis state if the dips are to the right of the equilibrium point. A person having ordinary skill in the art will appreciate that assignment of the labels "0" and "1" for states |0⟩ and |1⟩ is arbitrary and that the direction of circulation of the current in the superconducting qubit is the actual physical quantity being measured.

The fidelity of the readout (407 of FIG. 4) is limited by the occurrence of Landau-Zener transitions. A Landau-Zener is a transition between energy states across the anticrossing illustrated in FIG. 9A. A person having ordinary skill in the art will appreciate that the mere occurrence of Landau-Zener transitions does not necessarily convey information about the state of a qubit prior to readout, particularly in adiabatic readout processes. The exact form and phase of such transitions conveys such state information. A Landau-Zener transition will appear as a wide, short dip on the oscilloscope screen using the apparatus depicted in FIG. 8. However, the occurrence of a Landau-Zener transition is only useful if the readout process (the sweep through an applied flux range) occurring is diabatic. The processes that can be diabatic are certain embodiments of the readout process for a small number of qubits.

In general, and especially during adiabatic evolution for adiabatic quantum computation (transition 404 of FIG. 4), a Landau-Zener transition may not be permitted to occur. The occurrence of a Landau-Zener transition is useful for some configurations of quantum system 850 (FIG. 8) in some read out embodiments (407) if such read out processes are diabatic. Landau-Zener transitions may not occur during acts 401, 403, 404, and 405 of FIG. 4 and, in fact, the probability that such a transition will occur in act 404 serves to limit the time in which quantum system 850 can be adiabatically evolved from $H_0$ to $H_P$.

One embodiment of the present methods makes use of a negative feedback loop technique to ensure that Landau-Zener transitions do not occur during adiabatic evolution 404 (FIG. 4). In this feedback technique, the user of an adiabatic quantum computer observes the readout from one or more superconducting qubits undergoing adiabatic evolution. If an anticrossing is approached too fast, tank circuit 810 coupled to quantum system 850 (FIG. 8) will exhibit a voltage dip. In response, the user, or an automated system, can repeat the entire process depicted in FIG. 4 but evolve at a slower rate during 404 so that evolution 404 remains adiabatic. This procedure permits the adiabatic evolution to occur at a variable rate, while having a shorter duration, and remain an adiabatic process.

In some embodiments of the present methods, the change in magnitude of the response of tank circuit, $\chi$, ranges from about 0.01 radians to about 6 radians for the phase signal. In some embodiments of the present methods, the change in magnitude of the response of the tank circuit, $\tan(\chi)$, ranges from about 0.02 microvolt ($\mu$V) to about 1 $\mu$V for the amplitude signal.

Adiabatic Readout

Embodiments of the present methods can make use of an adiabatic process to readout the state of the superconducting qubit during measurement 407. Additional flux $\Phi_A$ and rf flux $\Phi_{RF}$ are added to the superconducting qubit and are modulated in accordance with the adiabatic processes described above. In instances where an additional flux generates a dip in the voltage of tank circuit 810 and this additional flux exceeds the amount of flux needed to reach the equilibrium point of the qubit, the qubit is deemed to have been in the |0⟩ quantum state at the beginning of measurement 407, in accordance with the conventions of FIG. 9B. Conversely, in instances where such additional flux generates a dip in the voltage of tank circuit 810 and this additional flux is less than the amount of additional flux needed to reach the equilibrium point of the qubit, the qubit is deemed to have been in the |1⟩ at the beginning of measurement 407, in accordance with the conventions of FIG. 9B. The voltage dip is proportional to the second derivative of the energy level with respect to flux, or other parameters for other qubits. Therefore, the dip occurs at and around the anticrossing 960 where the curvature of the energy level is greatest. After reading out the state of the superconducting qubit, the qubit is returned to its original state according to $H_p$ by adiabatically removing the additional flux in the qubit. The result of the readout is recorded as a part of 407. In some embodiments, the adiabatic nature of this type of readout does not alter the state of the superconducting qubit.

Repeated Readout

Embodiments of the present methods can make use of repeated adiabatic processes to readout the states of a plurality of superconducting qubits in quantum system 850 (FIG. 8). Such embodiments work by reading the state of each superconducting qubit in succession. In embodiments where quantum system comprises a plurality of qubits, each qubit in the plurality of qubits is independently readout in a successive manner such that when any give qubit in the plurality of qubits in the quantum system 850 is being readout all other qubits in the quantum system are not being readout. A qubit that is being readout while other qubits in the quantum system are not being readout is referred to in this section as a target qubit.

In some embodiments, each qubit in quantum system 850 (FIG. 8) is read out adiabatically such that the quantum state of each of the remaining qubits in the quantum system is not altered. In some embodiments, the state of all the qubits, target and other, are not altered during the readout process 407 of any give target qubit. The target qubit's state is temporarily flipped but the qubit is returned to its original state by adiabatically removing the additional flux in the target qubit. This contributes a multiplicative factor, based on the number of qubits in quantum system 850, to the length of adiabatic computation time. However, any single multiplicative factor keeps the overall adiabatic computation time polynomial with respect to the number of qubits. In some embodiments, quantum system 850 comprises two or more qubits.

Biasing Qubits During Measurement

As part of measurement 407, each qubit, when it is the target qubit, in the plurality of superconducting qubits in quantum system 850 (FIG. 8) is biased. The magnetic fields for the bias can be applied by the bias lines proximate on the qubit. The current used to bias the qubit is dependent on the mutual inductance between the qubit and the bias line. In some embodiments of the present methods, currents used in biasing the qubit have values of between about 0 milliamperes and about 2 milliamperes, inclusive. Here, the term "about" means±20% of the stated value. In such embodiments, a target qubit within quantum system 850 is selected. Additional flux $\Phi_A$ and rf flux $\Phi_{RF}$ are added to the target qubit, and are modulated in accordance with the adiabatic readout processes described above. In such instances, when the additional flux that produces a voltage dip in tank circuit 810 is more than the amount of flux associated with the equilibrium point of the qubit, the qubit is deemed to have been in the |0⟩ state at the beginning of measurement 407 in accordance with the conventions of FIG. 9. Similarly, when the additional flux that produces a voltage dip in tank circuit 810 is less than the amount of flux associated with the equilibrium point of the qubit, the qubit is deemed to have been in the |1⟩ state in accordance with the conventions of FIG. 9. After reading out the state of the target qubit, the target qubit is returned to the state that the qubit was in prior to measurement. The result of the readout is recorded in vector $\vec{O}$ as a part of 407. The process is repeated for a new target qubit in the plurality of qubits until all the qubits have been readout. In some embodiments, when a new target is selected, a randomly selected bias is applied to the old target qubit. Randomization of the order of target qubits and rerunning the computation helps avoid errors. The adiabatic nature of this type of readout typically does not flip the state of the target qubit nor any of the superconducting qubits in the plurality of superconducting qubits.

Application of Approximate Evaluation Techniques

The detailed exact calculation of energy spectra of an instantaneous Hamiltonian H(t) can be intractable due to exponential growth of the problems size as a function of the number of qubits used in an adiabatic computation. Therefore, approximate evaluation techniques are useful as a best guess of the location of the crossings and anticrossings. Accordingly, some embodiments of the present methods make use of an approximate evaluation method to locate anticrossing of the energies, or energy spectra, of the qubits in quantum system 850. Doing so lessens the time needed to probe the anticrossing and crossings with additional flux.

In an embodiment of the present methods, techniques collectively known as random matrix theory (RMT) are applied to analyze the quantum adiabatic algorithm during readout. See Brody et al., 1981, *Rev. Mod. Phys.* 53, p. 385.

In another embodiment of the present methods, spin density functional theory (SDFT) is used as an approximate evaluation method to locate anticrossing of the energies of the system. The probing of the energy spectra by the additional flux can then be used to locate the crossings and anticrossing and perform a readout of the state of superconducting qubits.

In another embodiment of the present methods, the approximate evaluation technique comprises a classical approximation algorithm in order to solve NP-Hard problems. When there is a specific instance of a problem to be solved, the problem is mapped to a description of the qubits being used to solve the NP-Hard problem. This process involves finding an approximation algorithm to the problem being solved by the quantum computer and running the approximation algorithm. The approximate solution is then mapped to the quantum computer's state using the mapping that was used to encode the instance of the NP-Hard problem. This provides a good estimate for the state of the superconducting qubits and lessens the requirements on probing the energy levels for crossings and anticrossings. Such a mapping typically involves setting the coupling energies between the qubits being used to solve the NP-Hard problem so that the qubits approximately represent the problem to be solved. For examples of approximation algorithms useful for the present methods see Goemans and Williamson, "0.878-approximation algorithms for MAX CUT and MAX 2SAT," In *Proceedings of the Twenty-Sixth Annual ACM Symposium on the Theory of Computing*, pages 422-431, Montréal, Québec, Canada, 23-25 May 1994.

Adiabatic Quantum Computing with Charge Qubits

In accordance with an aspect of the present methods, superconducting charge qubits can be used in adiabatic quantum computation devices (e.g., in quantum systems 850). In an embodiment of the present methods, capacitively coupled superconducting charge qubits can be used for adiabatic quantum computing. In an embodiment of the present methods, the charge qubits have a fixed or tunable tunneling term. In an embodiment of the present methods, the couplings between charge qubits have a fixed or tunable sign and/or magnitude of coupling. Some embodiments of the present methods are operated in a dilution refrigerator, where the temperature is about between about 10 milliKelvin and 4.2 Kelvin.

Representative System

Figure 11:
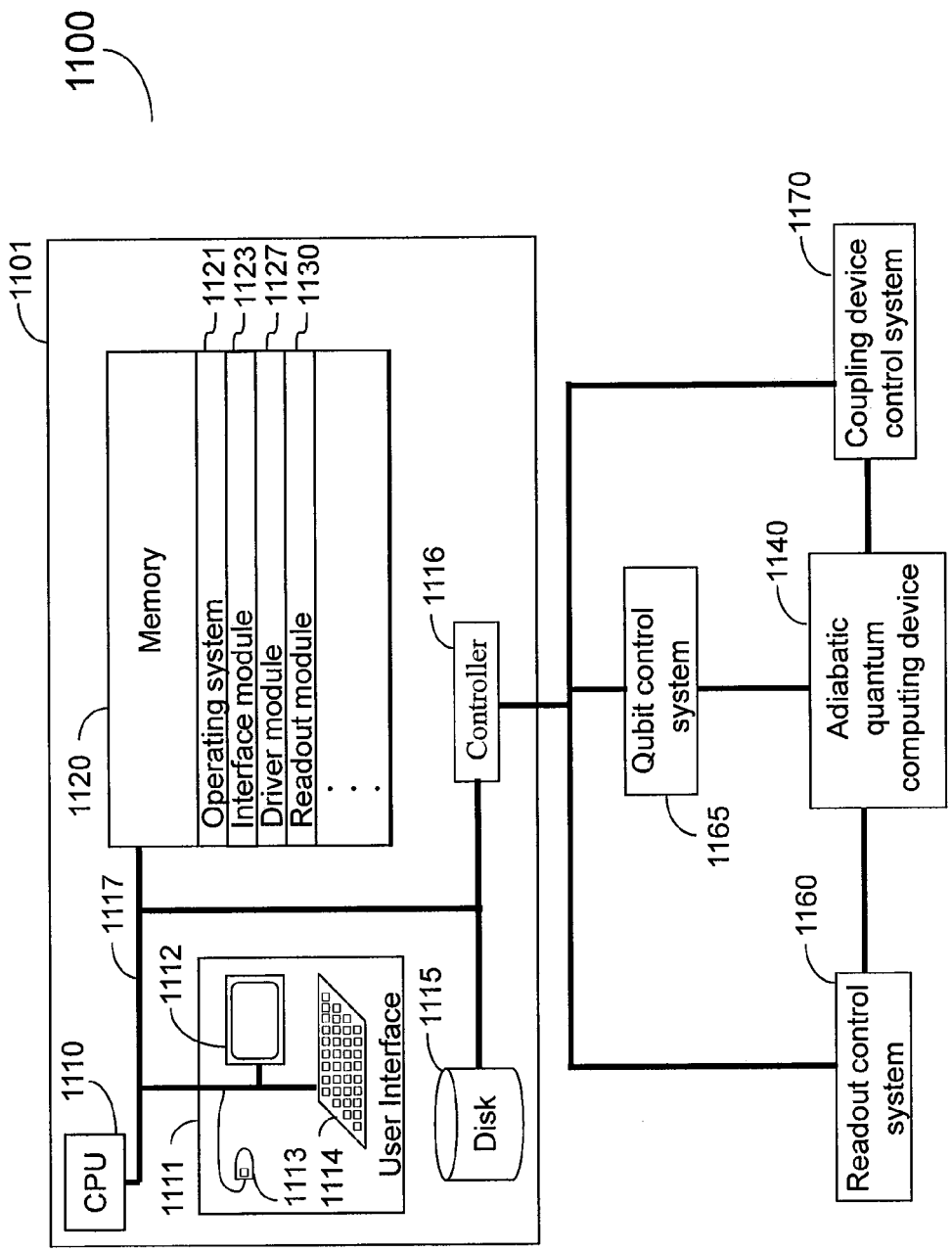
FIG. 11 illustrates a system that is operated in accordance with some embodiments of the present methods.

FIG. 11 illustrates a system 1100 that is operated in accordance with one embodiment of the present methods. System 1100 includes at least one digital (binary, conventional) interface computer 1101. Computer 1101 includes standard computer components including at least one central processing unit 1110, memory 1120, non-volatile memory, such as disk storage 1115. Both memory and storage are for storing program modules and data structures. Computer 1101 further includes input/output device 1111, controller 1116 and one or more busses 1117 that interconnect the aforementioned components. User input/output device 1111 includes one or more user input/output components such as a display 1112, mouse 1113, and/or keyboard 1114.

System 1100 further includes an adiabatic quantum computing device 1140 that includes those adiabatic quantum computing devices shown above. Exemplary examples of adiabatic quantum computing devices 1140 include, but are not limited to, devices 101 of FIG. 1; 500, 510, 525, 535, and 555 of FIG. 5; and 800 of FIG. 8. This list of exemplary examples of adiabatic quantum computing devices is nonlimiting. A person of ordinary skill in the art will recognize other devices suitable for 1140.

System 1100 further includes a readout control system 1160. In some embodiments, readout control system 1160 comprises a plurality of magnetometers, or electrometers, where each magnetometer or electrometer is inductively coupled, or capacitively coupled, respectively, to a different qubit in quantum computing device 1140. In such embodiments, controller 1116 receives a signal, by way of readout control system 1160, from each magnetometer or electrometer in readout device 1160. System 1100 optionally comprises a qubit control system 1165 for the qubits in quantum computing device 1140. In some embodiments, qubit control system 1165 comprises a magnetic field source or electric field source that is inductively coupled or capacitively coupled, respectively, to a qubit in quantum computing device 1140. System 1100 optionally comprises a coupling device control system 1170 to control the couplings between qubits in adiabatic quantum computing device 1140.

In some embodiments, memory 1120 includes a number of modules and data structures. It will be appreciated that at any one time during operation of the system, all or a portion of the modules and/or data structures stored in memory 1120 are resident in random access memory (RAM) and all or a portion of the modules and/or data structures are stored in non-volatile storage 1115. Furthermore, although memory 1120, including non-volatile memory 1115, is shown as housed within computer 1101, the present methods is not so limited. Memory 1120 is any memory housed within computer 1101 or that is housed within one or more external digital computers (not shown) that are addressable by digital computer 1101 across a network (e.g., a wide area network such as the internet).

In some embodiments, memory 1120 includes an operating system 1121. Operating system 1121 includes procedures for handling various system services, such as file services, and for performing hardware dependant tasks. In some embodiments of the present methods, the programs and data stored in system memory 1120 further include an adiabatic quantum computing device interface module 1123 for defining and executing a problem to be solved on an adiabatic quantum computing device. In some embodiments, memory 1120 includes a driver module 1127. Driver module 1127 includes procedures for interfacing with and handling the various peripheral units to computer 1101, such as controller 1116 and control systems 1160, qubit control system 1165, coupling device control system 1170, and adiabatic quantum computing device 1140. In some embodiments of the present methods, the programs and data stored in system memory 1120 further include a readout module 1130 for interpreting the data from controller 1116 and readout control system 1160.

The functionality of controller 1116 can be divided into two classes of functionality: data acquisition and control. In some embodiments, two different types of chips are used to handle each of these discrete functional classes. Data acquisition can be used to measure physical properties of the qubits in adiabatic quantum computing device 1140 after adiabatic evolution has been completed. Such data can be measured using any number of customized or commercially available data acquisition microcontrollers including, but not limited to, data acquisition cards manufactured by Elan Digital Systems (Fareham, UK) including, but not limited to, the AD132, AD136, MF232, MF236, AD142, AD218, and CF241. In some embodiments, data acquisition and control is handled by a single type of microprocessor, such as the Elan D403C or D480C. In some embodiments, there are multiple interface cards 1116 in order to provide sufficient control over the qubits in a computation 1140 and in order to measure the results of an adiabatic quantum computation on 1140.

CONCLUSION

When introducing elements of the present methods or the embodiment(s) thereof, the articles "a," "an," "the," and "said" are intended to mean that there are one or more of the elements. The terms "comprising," "including," and "having" are intended to be inclusive and to mean that there may be additional elements other than the listed elements. Moreover, the term "about" has been used to describe specific parameters. In many instances, specific ranges for the term "about" have been provided. However, when no specific range has been provided for a particular usage of the term "about" herein, than either of two definitions can be used. In the first definition, the term "about" is the typical range of values about the stated value that one of skill in the art would expect for the physical parameter represented by the stated value. For example, a typical range of values about a specified value can be defined as the typical error that would be expected in measuring or observing the physical parameter that the specified value represents. In the second definition of about, the term "about" means the stated value ±0.10 of the stated value. As used herein, the term "instance" means the execution of an act. For example, in a multi-act method, a particular act may be repeated. Each repetition of this act is referred to herein as an "instance" of the act.

All references cited herein, including but not limited to U.S. provisional patent application No. 60/557,748, filed on Mar. 29, 2004; 60/588,002, filed on Jul. 13, 2004; and 60/762,619, filed Jan. 27, 2006; and United States Application Publication Number 2005/0224784 A1, filed on Mar. 28, 2005, entitled "Adiabatic Quantum Computation with Superconducting Qubits," United States Application Publication Number 2005/0250651 A1, filed Mar. 28, 2005, entitled "Adiabatic Quantum Computation with Superconducting Qubits," and United States Application Publication Number 2005/0256007 A1, entitled "Adiabatic Quantum Computation with Superconducting Qubits," filed on Mar. 28, 2005, are incorporated herein by reference in their entireties and for all purposes to the same extent as if each individual publication or patent or patent application was specifically and individually indicated to be incorporated by reference in its entirety for all purposes.

ALTERNATIVE EMBODIMENTS

The present methods can be implemented as a computer program product that comprises a computer program mechanism embedded in a computer readable storage medium. For instance, the computer program product could contain program modules, such as those illustrated in FIG. 11, that implement the various methods described herein. These program modules can be stored on a CD-ROM, DVD, magnetic disk storage product, or any other computer readable data or program storage product. The software modules in the computer program product can also be distributed electronically, via the Internet or otherwise, by transmission of a computer data signal (in which the software modules are embedded) on a carrier wave.

Those skilled in the art would appreciate that while superconducting flux qubits are primarily discussed herein, superconducting charge qubits, superconducting phase qubits, superconducting hybrid qubits, quantum dots, trapped ions, trapped neutral atoms, qubits formed using nuclear spins, and photonic qubits could all be used to produce quantum systems capable of practicing the methods described.

Also, those skilled in the art will appreciate that readout of the state of a quantum system can also be completed though the employ of dc-SQUIDs or magnetic force microscopes (MFM) in place of a tank circuit which is discussed extensively.

Many modifications and variations of the present methods can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A method for adiabatic quantum computing using a quantum system comprising a plurality of superconducting qubits, wherein the quantum system is capable of being in any one of at least two configurations at any give time, the at least two configurations including:
   a first configuration described by an initialization Hamiltonian $H_O$ having a first state; and
   a second configuration described by a problem Hamiltonian $H_P$ having a second state, the method comprising:
      initializing the quantum system to the first configuration;
      evolving the quantum system wherein at least a portion of the evolution is adiabatically evolved thereby achieving an adiabatic evolution wherein a state of the quantum system during the adiabatic evolution is characterized by an evolution Hamiltonian H until it is described by the second state of the problem Hamiltonian $H_P$, and wherein the evolution Hamiltonian H comprises an energy spectrum with at least one anticrossing;
      controlling a rate of the adiabatic evolution via an evolution rate parameter $\gamma(t)$;
      reducing the rate of change of the evolution rate parameter $\gamma(t)$ during the adiabatic evolution in a vicinity of a first anticrossing in the at least one anticrossing; and
      reading out the state of the quantum system.

2. The method of claim 1 wherein controlling a rate of the adiabatic evolution via an evolution rate parameter $\gamma(t)$ includes controlling the rate of the adiabatic evolution via the evolution rate parameter $\gamma(t)$ ranging between about 0 and about 1.

3. The method of claim 2 wherein the evolution rate parameter $\gamma(t)$ is between about 0.3 to about 0.7 in the vicinity of the first anticrossing.

4. The method of claim 1 wherein the rate of change of the evolution rate parameter $\gamma(t)$ is reduced by a factor of at least about 2 in the vicinity of the first anticrossing relative to the rate of change of the evolution rate parameter in a part of the energy spectrum that is not in the vicinity of the first anticrossing.

5. The method of claim 1 wherein the rate of change of the evolution rate parameter $\gamma(t)$ is reduced when the value of the evolution rate parameter is within about ten percent of the value the evolution rate parameter has at the first anticrossing.

6. The method of claim 1 wherein reducing the rate of change includes reducing at least one of: a rate at which at least one of a coupling strength between at least one pair of superconducting qubits in the plurality of superconducting qubits is changed, a tunneling amplitude of at least one superconducting qubit in the plurality of superconducting qubits is changed, and a local bias of at least one superconducting qubit in the plurality of superconducting qubits is changed.

7. The method of claim 6 wherein the local bias includes at least one of a flux bias and a charge bias.

8. The method of claim 1 wherein the vicinity of the first anticrossing is determined by a statistical analysis of a plurality of problem Hamiltonians.

9. The method of claim 1 wherein each respective superconducting qubit in the plurality of superconducting qubits is initialized by a respective qubit bias such that each respective qubit bias defines at least a portion of a computational problem to be solved.

10. The method of claim 1 wherein each respective first superconducting qubit in the plurality of superconducting qubits is arranged with respect to a respective second superconducting qubit in the plurality of superconducting qubits such that the first superconducting qubit and the corresponding second superconducting qubit define a predetermined coupling strength and wherein the predetermined coupling strength between each first superconducting qubit and corresponding second superconducting qubit in the plurality of superconducting qubits collectively define at least a portion of a computational problem to be solved.

11. The method of claim 1 wherein the problem Hamiltonian $H_P$ comprises a tunneling term for each superconducting qubit in the plurality of superconducting qubits, and wherein the energy of the tunneling term for each superconducting qubit in the plurality of superconducting qubits is less than an average of a set of absolute values of the predetermined coupling strengths between each first superconducting qubit and second superconducting qubit in the plurality of superconducting qubits.

12. The method of claim 1 wherein the reading out includes probing an observable of at least one of a $\sigma_X$ Pauli matrix operator and a $\sigma_Z$ Pauli matrix operator for at least one of the superconducting qubits in the plurality of superconducting qubits.

13. The method of claim 1 wherein at least one of the superconducting qubits in the plurality of superconducting qubits is selected from the group consisting of a persistent current qubit and a superconducting flux qubit.

14. The method of claim 1 wherein at least one of the superconducting qubits in the plurality of superconducting qubits is capable of tunneling between a first stable state and a second stable state when the quantum system is in the first configuration.

15. The method of claim 1 wherein at least one of the superconducting qubits in the plurality of superconducting qubits is capable of tunneling between a first stable state and a second stable state during the evolution.

* * * * *